United States Patent
Jiang

(10) Patent No.: US 8,275,372 B2
(45) Date of Patent: Sep. 25, 2012

(54) METHOD AND SYSTEM FOR PROVIDING CAMEL SERVICES TO A HOME NETWORK'S OUTBOUND ROAMER WITHOUT NEED FOR CAMEL SUPPORT OR AGREEMENT

(75) Inventor: John Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 259 days.

(21) Appl. No.: 12/527,968

(22) PCT Filed: Feb. 27, 2008

(86) PCT No.: PCT/US2008/002542
§ 371 (c)(1),
(2), (4) Date: Jan. 4, 2010

(87) PCT Pub. No.: WO2008/127512
PCT Pub. Date: Oct. 23, 2008

(65) Prior Publication Data
US 2010/0144344 A1  Jun. 10, 2010

Related U.S. Application Data

(60) Provisional application No. 60/903,521, filed on Feb. 27, 2007, provisional application No. 60/904,184, filed on Mar. 1, 2007.

(51) Int. Cl.
*H04W 4/00* (2009.01)
(52) U.S. Cl. .................. 455/433; 455/432.1; 455/432.2; 455/432.3
(58) Field of Classification Search ............... 455/432.1, 455/432.2, 432.3, 433, 414.1
See application file for complete search history.

(56) References Cited

U.S. PATENT DOCUMENTS 7,742,763 B2  6/2010  Jiang
(Continued)

FOREIGN PATENT DOCUMENTS

EP   1 313 343 B1   5/2003
(Continued)

OTHER PUBLICATIONS

GSM 902 on MAP Specification Digital Cellular Telecommunications (Phase 2+); Mobile Application Part (MAP) Specification (3GPP TS 09.02 version 7.9.0 Release 1998).

(Continued)

*Primary Examiner* — Nathan Mitchell
(74) *Attorney, Agent, or Firm* — Arent Fox LLP

(57) ABSTRACT

The present invention provides a method for enabling support of IN services for an HPMN's outbound roamer. The method provides a client-server architecture that enables exchange of messages between a client coupled to the outbound roamer's mobile device and a gateway coupled to the HPMN network. The method includes enabling a client on the outbound roamer's mobile device after successful registration of the outbound roamer with a VPMN and based on exchange of one or more parameters, encapsulated over one or more bearers, with a gateway. Moreover, the HPMN and the VPMN do not support either exchange of IN messages or an IN agreement. The method further includes facilitating communication between the client and an HPMN service node or an HPMN SCP, via the gateway that facilitates communication by translating the encapsulated IN messages in a protocol compatible with either the service node or the SCP. The method further includes managing the IN services using the gateway and either the service node or the SCP, by updating the outbound roamer's one or more traffic control conditions at the client.

30 Claims, 15 Drawing Sheets

System architecture for enabling CAMEL (or IN) services for outbound roamers

U.S. PATENT DOCUMENTS

| | | | |
|---|---|---|---|
| 2003/0095566 A1* | 5/2003 | Bunting et al. | 370/465 |
| 2004/0242227 A1* | 12/2004 | Huotari et al. | 455/432.1 |
| 2006/0276226 A1* | 12/2006 | Jiang | 455/558 |
| 2007/0133782 A1* | 6/2007 | Zhu | 379/265.09 |
| 2008/0261559 A1* | 10/2008 | Cai et al. | 455/406 |
| 2008/0299967 A1* | 12/2008 | Kazmi | 455/433 |
| 2009/0245496 A1* | 10/2009 | Maione et al. | 379/201.12 |
| 2009/0316868 A1* | 12/2009 | Mariniello | 379/142.04 |
| 2010/0022232 A1* | 1/2010 | Bonner et al. | 455/418 |

FOREIGN PATENT DOCUMENTS

WO    WO 00/10352 A    2/2000

OTHER PUBLICATIONS

GSM 340 on SMS Digital cellular telecommunications system (Phase 2+); Technical realization of the Short Message Service (SMS); (GSM 03.40 version 7.4.0 Release 1998).

GSM 378 on CAMEL Digital Cellular telecommunications system (Phase 2+);Customized Applications for Mobile network Enhanced Logic (CAMEL) Phase 2; Stage 2 (GSM 03.78 version 7.2.0 Release 1998).

GSM 978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).

3 GPP TS 29.010 V3.10.0 (Dec. 2002); Technical Specification; $3^{rd}$ Generation Partnership Project; Technical Specification Group Core Network; Information element mapping between Mobile Station-Base Station System (MS-BSS) and Base Station System—Mobile-services Switching Centre (BSS—MSC); Signalling procedures and the Mobile Application Part (MAP) (Release 1999).

GSM 03.79 on CAMEL Support of Optimal Routing (SOR), Jun. 2000.

GSM 318 Basic Call Handling, May 2000.

Q761 (Functional description of the ISDN User Part of CCITT Signaling System No. 7) (Dec. 1999).

Q762 (General Functions of CCITT Signaling System No. 7 ISDN User Part Messages and parameters). 1999.

Q 763 (Formats and codes of CCITT Signaling System No. 7 ISDN User Part Message and parameters). 1999.

Q 764 (1999), Signaling System No. 7—ISDN User Part signaling procedures.

Q765 (Application Transport Mechanism, CCITT Signaling System No. 7 ISDN User Part ) (May 1998).

Q766 (Performance Objectives in the Integrated Services Digital Network Application, CCITT Signaling System No. 7 ISDN User Part) (Mar. 1993).

Q767 (ITU-T—Application of the ISDN User Part of CCITT Signaling System No. 7 for International ISDN Interconnections) (1991).

Q768 (ITU-T—Signalling Interface Between an International Switching Centre (ISC) and an ISDN Satellite Subnetwork) (Oct. 1995).

Q769 (ITU-T—ISDN User Part Enhancements for the Support of Number Portability) (Dec. 1999).

Q1214, ITU-T Intelligent Network Distributed Functional Plane For Intelligent Network CS-1. 1995.

Q1215, ITU-T Physical Plane for Intelligent Network CS-1. 1995.

Q1218 ITU-T Interface Recommendation for Intelligent Network CS-1. 1995.

Q 711 (1996), Functional description of signaling connection control part.

Q 712 (1996), Definition and function of signaling connection control part messages.

Q713 (1996), Signaling connection control part formats and codes.

Q 714 (1996), Signal connection control part procedures.

Q701, Specifications of Signalling System No. 7—Functional Description of the Message Transfer Part (MTP) of Signalling System No. 7. 1993.

Q702 ITU-T Specifications of Signalling System No. 7, Signalling Data Link. 1993.

Q703 ITU-T Specifications of Signalling System No. 7—Message Transfer Part. Signalling link. 1996.

Q704, Signalling network functions and messages. Specifications of Signalling System No. 7—Message Transfer Part. (Jul. 1996).

* cited by examiner

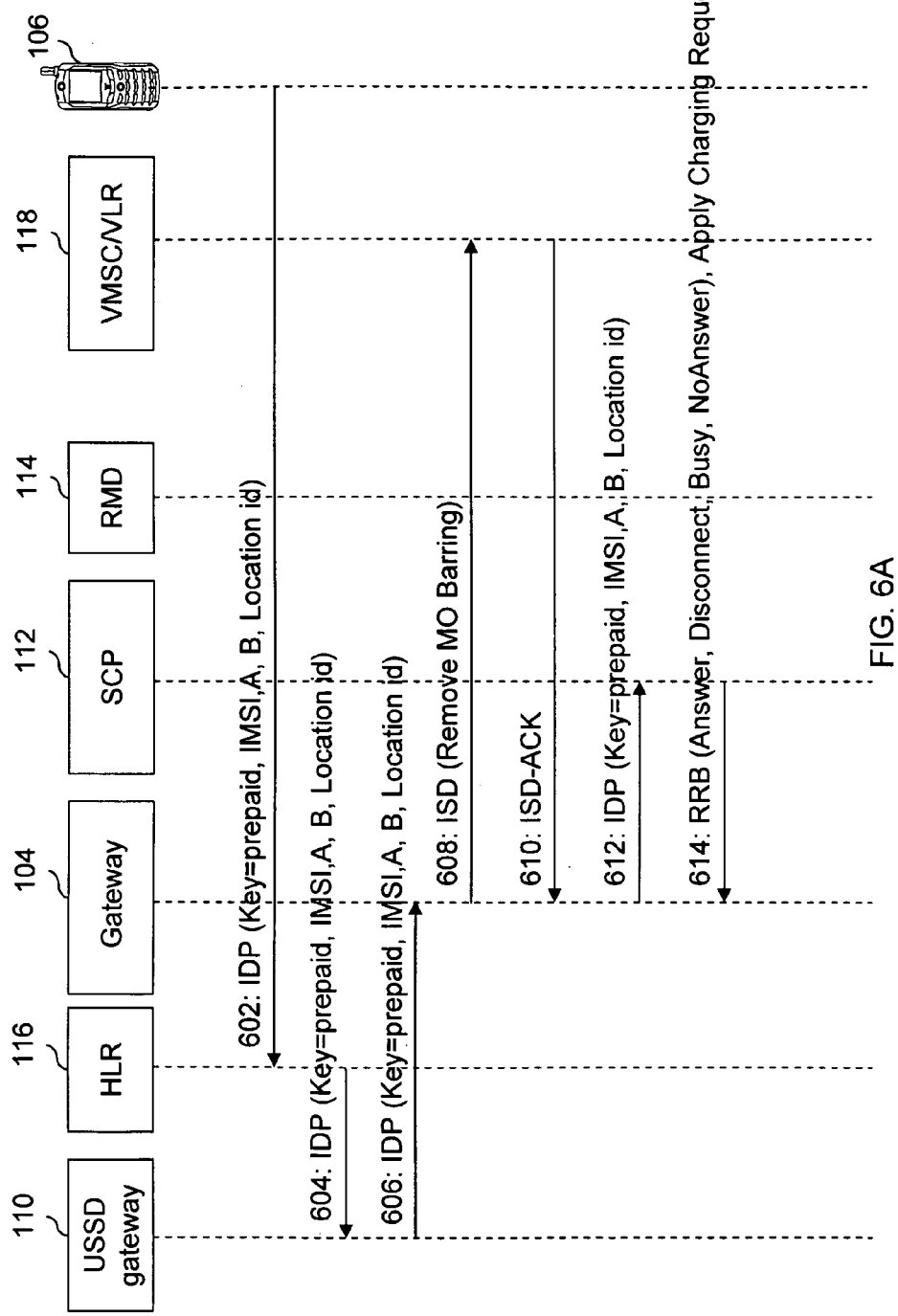

METHOD AND SYSTEM FOR PROVIDING CAMEL SERVICES TO A HOME NETWORK'S OUTBOUND ROAMER WITHOUT NEED FOR CAMEL SUPPORT OR AGREEMENT

RELATED APPLICATIONS

This application claims the benefit of U.S. Provisional Patent Application No. 60/903,521 entitled "CAMEL Services for Outbound Roaming Without the Need of CAMEL Support or Agreement," filed Feb. 27, 2007. This application is also related to U.S. patent application Ser. No. 11/366,017, entitled "Dynamic Camel Approach for Implementing Call Control Services for Outbound Roamers," filed Mar. 2, 2006, claiming the benefit of U.S. Provisional Patent Application No. 60/657,798 entitled "Dynamic Camel Approach for Implementing Call Control Services for Outboard Roamers," filed Mar. 2, 2005. Each of these related patent applications is incorporated herein by this reference in its entirety.

FIELD OF THE INVENTION

The present invention generally relates to mobile communication of outbound roamers. More specifically, the invention relates to enabling support of Customized Applications for Mobile network Enhanced Logic (CAMEL) services for outbound roamers of a home network roaming in visited networks.

BACKGROUND OF THE INVENTION

Various network operators offer national and international roaming to their subscribers by establishing roaming coverage worldwide. These network operators generate majority of roaming revenue from their outbound roamers traveling to different visited networks. The outbound roamers of a home network performing call and non-call related activities (e.g., Value Added Services (VASs)) in any of these visited networks eventually result in increasing outbound roaming revenue for the home network operator.

In one technique of providing outbound roaming, the home network operator uses Customized Application for Mobile network Enhanced Logic (CAMEL) service. The CAMEL service allows the home network operator to provide its prepaid outbound roamers at a visited network with the home network, like Mobile Originated (MO) calls and messages experience. Further, the CAMEL service facilitates real time billing and correct deduction of balance from outbound roamer's prepaid account. The home network operator is able to provision retail billing of its outbound roamers in real time, instead of waiting for Transferred Accounting Procedure (TAP) records from the visited network. In case the home network wishes to restrict outbound roamer's services in the visited network, it can apply Operator Determined Barring (ODB) on calls and messages of the outbound roamer while he is in the visited network. However the ODB may fail for outbound roamers with premium numbers as these numbers may often vary. The CAMEL service allows the home network operator to restrict the outbound roamer's calls and messages in real time and thus facilitate fraud control.

Furthermore, the CAMEL service also allows network operators to cater to their postpaid outbound roamers for Virtual Home Environment (VHE) services such as home short code, home dialing experience and Virtual Private Network (VPN) services. Many network operators enable CAMEL support for both prepaid and postpaid outbound roaming. CAMEL service is also useful for selective home routing or least cost routing of calls, Calling Line Identification (CLI) delivery, or a third party partner carrier routing of calls from the outbound roamer. In this case, the outbound roamer's call can be selectively routed back to his home network or a partner network, based on a called number and a calling network and their associated tariff (e.g. termination charge at called number network).

However, in order to avail one or more of the above mentioned benefits of CAMEL service generally both the home network and visited networks are required to support CAMEL protocol in their networks. In some cases they are also required to establish CAMEL agreements with each other—a process which is time consuming and introduces delay and friction into the international roaming business.

Accordingly, there is a need in the art of a system, a method, and a computer product, which allows prepaid and postpaid outbound roamers of a home network to roam in visited networks even when either the home network or visited networks do not support CAMEL (or Intelligent Network (IN)) protocol or they do not have a CAMEL (or IN) agreement with each other.

SUMMARY

The present invention is directed towards a method for enabling support of Intelligent Network (IN) services for an outbound roamer of an HPMN. The method provides a client-server architecture that enables exchange of messages between a client coupled to the outbound roamer's mobile device and a gateway coupled to the HPMN network. The client is enabled (and verified) upon detecting a successful location update of the outbound roamer in a VPMN, and by exchanging encapsulated IN messages with the gateway over one or more bearers. Moreover, the HPMN and the VPMN are unable to support either exchange of IN messages or an IN agreement. The method further includes facilitating communication between the client and an HPMN service node, or the client and an HPMN SCP, via the gateway. The gateway facilitates communication by translating the encapsulated IN messages, exchanged with the client, in a protocol that is compatible with either the HPMN service node or the HPMN SCP. The method further includes managing the outbound roamer's IN services using the gateway and one of the HPMN service node and the HPMN SCP, by updating the outbound roamer's one or more traffic control conditions at the client, based on recognition of the exchanged encapsulated IN messages.

Another aspect of the present invention presents a system for enabling support of IN services for an outbound roamer of an HPMN. The system includes a client coupled to the outbound roamer's mobile device. The system further includes a gateway in the HPMN for enabling the client based on observation of exchange of one or more parameters with the client. The client is enabled (and verified) upon detecting a successful location update of the outbound roamer in a VPMN, and by exchanging encapsulated IN messages with the client over one or more bearers. Moreover, the HPMN and the VPMN are unable to support either exchange of IN messages or an IN agreement. The gateway further facilitates communication between the client and an HPMN service node, or the client and an HPMN SCP by translating the encapsulated IN messages, exchanged with the client, in a protocol that is compatible with either the HPMN service node or the HPMN SCP. The gateway and one of the HPMN service node and the HPMN SCP further manage the outbound roamer's IN services, by updating the outbound roamer's one or more traffic control conditions at the client, based on recognition of the exchanged encapsulated IN messages.

Yet another aspect of the present invention provides a computer program product including a computer usable program code for enabling support of IN services for an outbound roamer of an HPMN by enabling a client that is coupled to the outbound roamer's mobile device based on observation of exchange of one or more parameters with a gateway. The client is enabled (and verified) upon detecting a successful location update of the outbound roamer in a VPMN, and by exchanging encapsulated IN messages with the gateway over one or more bearers. The gateway is deployed in the HPMN. Moreover, the HPMN and the VPMN are unable to support either exchange of IN messages or an IN agreement. Further, the computer program product facilitates communication between the client and an HPMN service node, or the client and an HPMN SCP, via the gateway. The gateway facilitates communication by translating the encapsulated IN messages, exchanged with the client, in a protocol that is compatible with either the HPMN service node or the HPMN SCP. Further, the computer program product manages the outbound roamer's IN services using the gateway and one of the HPMN service node and the HPMN SCP, by updating the outbound roamer's one or more traffic control conditions at the client, based on recognition of the exchanged encapsulated IN messages.

BRIEF DESCRIPTION OF DRAWINGS

In the drawings, the same or similar reference numbers identify similar elements or acts.

FIGS. 6A, 6B, 6C and 6D illustrate a flow diagram for the handling of MO call by the prepaid outbound roamer in the VPMN, in accordance with an embodiment of the present invention;

DETAILED DESCRIPTION

Figure 1:
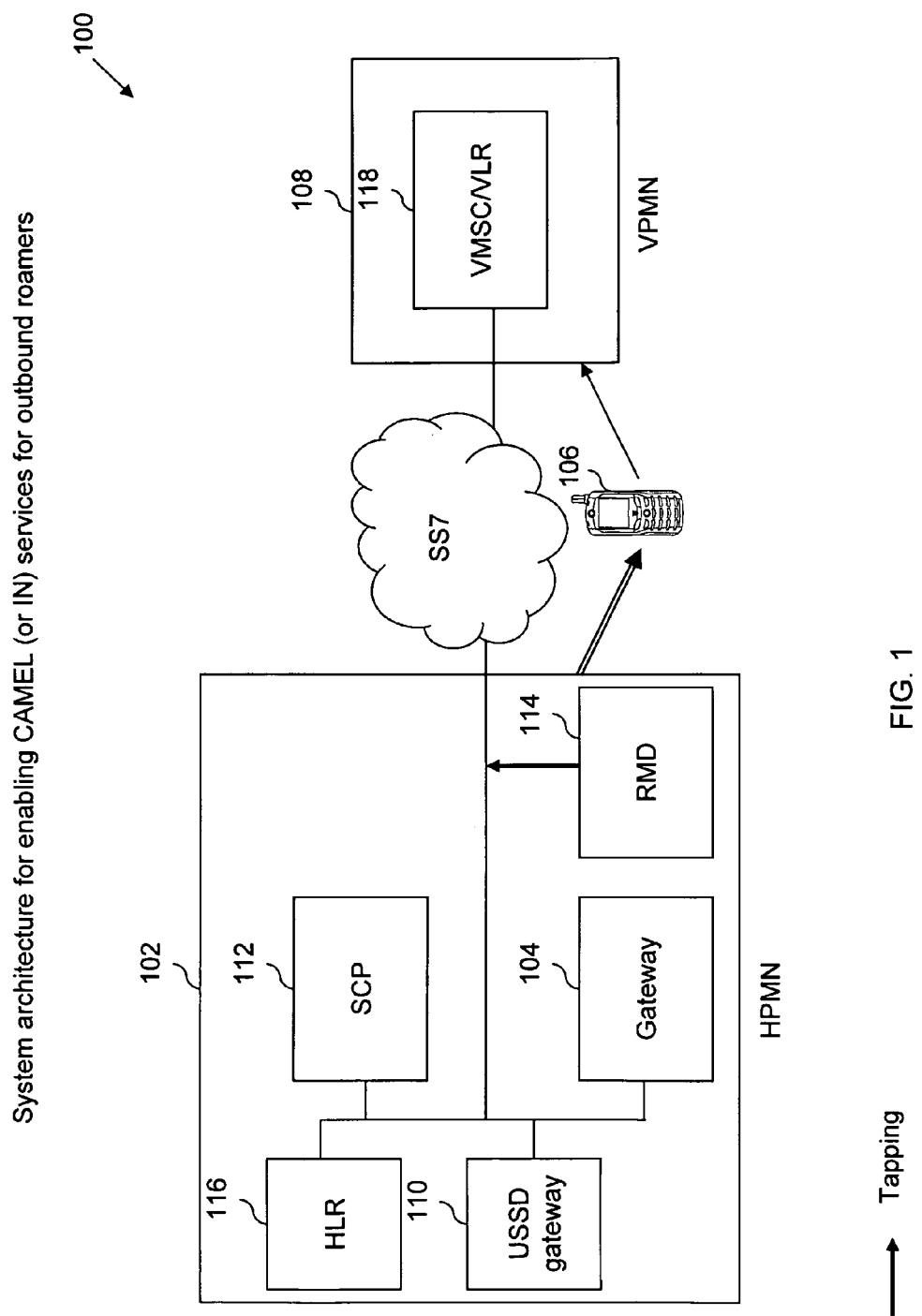
FIG. 1 illustrates a system for providing Customized Applications for Mobile network Enhanced Logic (CAMEL) or Intelligent Network (IN) services to an outbound roamer of a Home Public Mobile Network (HPMN), in accordance with an embodiment of the present invention.

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product that enables support of Customized Application for Mobile Enhanced Logic (CAMEL)-based services, Intelligent Network (IN) services, "IN-like" or similar services. These types of services include, but are not limited to offering the benefit of IN variants, CAMEL phase 1 services, CAMEL phase 2 services, CAMEL phase 3 services, CAMEL phase 4 services, Wireless Intelligent Network (WIN) services, to outbound roamers of a home network when they are roaming in one or more visited networks. The present invention makes these types of services available, even when either the home network or a visited network does not support CAMEL (or IN or IN-like) protocol, or they do not have CAMEL (or IN or IN-like) agreement or any combination thereof. It will be apparent to a person skilled in the art that above statement envisions one or more of the following conditions:

1. The home network does not support CAMEL (or IN or IN-like) protocol.
2. The visited networks do not support CAMEL (or IN or IN-like) protocol.
3. Both the home network and visited networks do not support CAMEL (or IN or IN-like) protocol.
4. The home network has no CAMEL (or IN or IN-like) agreement with these visited networks.

It will also be apparent to a person skilled in the art that the last condition includes the case where both the home network and the visited networks have CAMEL (or IN) support (either same or different CAMEL (or IN) versions/phases) but they do not possess any CAMEL (or IN) agreement with each other. For convenient reference, all above mentioned conditions of CAMEL (or IN) support, or agreement, or combination thereof are hereinafter interchangeably referred to as CAMEL (or IN) support/agreement. It will be apparent to a person skilled in the art that CAMEL (or IN) services include standard call and non-call related activities, such as, but not limited to, Mobile Originated (MO) call, MO Short Message Service (SMS), Packet Data Network (PDN), and other Value Added Services (VAS). It will also be apparent to a person skilled in the art that IN messages includes all IN/Camel-like messages as they might not be in exact format or encoding of a particular standard protocol. Also, these IN messages may be extended to include other information and control exchange messages without limiting the scope of the present invention. Hence the present invention allows the home network operator to offer its prepaid outbound roamers various roaming services in any of the visited networks without CAMEL (or IN) support/agreement. The provisioning of CAMEL (or IN) services within the scope of the present invention is hereinafter interchangeably referred to as "CAMEL Everywhere" service. Also, any outbound roamer when subscribing to the CAMEL everywhere service is hereinafter interchangeably referred to as CAMEL outbound roamer. The present invention caters to both prepaid and postpaid outbound roamers of the home network in any of such visited networks.

FIG. 1 illustrates a system 100 for providing CAMEL (or IN) services to an outbound roamer of a Home Public Mobile Network (HPMN) 102 (i.e., the home network), in accordance with an embodiment of the present invention. System 100 includes a CAMEL (or IN) gateway 104 deployed in HPMN 102 and a CAMEL (or IN) client 106 on the outbound roamer's mobile device (i.e. the client is coupled to the outbound roamer's mobile device).

Hereinafter, CAMEL (or IN) gateway 104 is interchangeably referred to as gateway 104, and CAMEL (or IN) client 106 is interchangeably referred to as client 106. In one embodiment of the present invention, client 106 is pre-installed on a Subscriber Identity Module (SIM) as a SIM Tool Kit (STK) application or an applet. In another embodiment of the present invention, in case the outbound roamer's mobile device is a smart phone (for example, a handset that permits the user to load and operate general purpose computer programs); client 106 is a computer program that is installed on the mobile device for the purpose of facilitating CAMEL Everywhere service. In an embodiment of the present invention, the outbound roamer installs the smart phone client application on his mobile device by an Over The Air (OTA) data connection. In other embodiments, client 106 may be installed in any manner that programs are installed in handsets, including without limitation when the handset is manufactured, when it is configured for the home network operator, or by a home network operator sales representative, or at the home network operator's retail store when a subscriber first purchases the handset.

The outbound roamer attempts to register with a Visited Mobile Public Network (VPMN) 108, in accordance with an embodiment of the present invention. In an embodiment of the present invention HPMN 102 supports CAMEL (or IN) signaling, and gateway 104 is deployed between an Unstructured Supplementary Service Data (USSD) gateway 110 and a CAMEL (or IN) Signaling Control Point (SCP) 112 in HPMN 102. Hereinafter, CAMEL (or IN) SCP 112 is referred to as SCP 112. In another embodiment of the present invention HPMN 102 supports ISDN User Part (ISUP) signaling, and system 100 includes a service node, and gateway 104 is deployed between USSD gateway 110 and the service node. In one embodiment of the present invention, SCP 112 is integrated with USSD gateway 110. In another embodiment of the present invention, USSD gateway 110 is integrated with gateway 104.

Gateway 104 interfaces with USSD gateway 110 over an Internet Protocol (IP) interface using an Extensible Markup language (XML), a Hyper Text Terminal Protocol (HTTP) connection, or a Simple Network Management Protocol (SNMP). In an embodiment of the present invention, the interface between gateway 104 and SCP 112 includes, but is not limited to, a CAMEL Application Protocol (CAP) protocol, an IN protocol, a Session Initiation Protocol (SIP) and an ISDN User Part (ISUP) protocol. In another embodiment of the present invention, HPMN 102 uses the IP interface to allow gateway 104 and SCP 112 to communicate with each other. This is done to ensure support of third party or legacy SCPs.

Furthermore, gateway 104 communicates with a Roaming Monitoring Device (RMD) 114 present in HPMN 102. RMD 114 taps roaming links between HPMN 102 and VPMN 108 to observe exchange of one or more parameters associated with the outbound roamer. These parameters include a device identifier, a cell id, a Visitor Location Register/Visited Mobile Switching Centre/Serving General Packet Radio Service (GPRS) Support Node (VLR/VMSC/SGSN) address, a location id, a service subscription information (e.g. Camel Subscription Information (CSI)), an International Mobile Subscriber Identity (IMSI), a security key, a Personal Identification Number (PIN), and a Mobile Station International Subscriber Directory Number (MSISDN) depending on HPMN 102 capabilities. Some of these and other parameters may also be exchanged between client 106 and gateway 104. In one case, when client 106 resides on a handset with location reporting capabilities (such as Global Positioning System, or a wifi-triangulation-type system, like those available on Apple's current iPhone), the smart phone client application may exchange that location information as the parameter with gateway 104.

HPMN 102 further includes a Home Location Register (HLR) 116. System 100 further includes in VPMN 108, a VLR 118 that is integrated with a VMSC. Since VLR 118 communicates with its integrated VMSC using an internal communication interface (called B-interface) and a Sub System Number (SSN), and they collectively reside in VPMN 108, they are hereinafter interchangeably referred to as VMSC/VLR 118. It will be apparent to a person skilled in the art that various components of HPMN 102 may communicate with various other components in VPMN 108 over Signaling System 7 (SS7) links.

In case HPMN 102 has a CAMEL (or IN) support/agreement with VPMN 108, the service subscription information is exchanged between HLR 116 and VMSC/VLR 118. In one case the service subscription information is exchanged between the SGSN and HLR 116. Alternatively, in case HPMN 102 does not have CAMEL (or IN) support/agreement with VPMN 108, the service subscription information is not exchanged.

At every successful Location Update (LUP) of the outbound roamer's mobile device at VPMN 108, once gateway 104 has enabled client 106 to request for Camel Everywhere Service, client 106 shares the outbound roamer's parameters with gateway 104, in accordance with an embodiment of the present invention. These parameters further allow gateway 104 to verify/check the security aspects of client 106 (e.g. the IMSI is coupled with correct mobile device ID). Once all checks are done, client 106 can then be further enabled for providing support of CAMEL (or IN) services i.e., CAMEL everywhere service. For a client that does not pass the security checks, gateway 104 disables that client and normal communication can be invoked between SCP 112 and various components of VPMN 108 as explained in conjunction with FIGS. 4A and 4B.

In another case, when client 106 detects a change is outbound roamer's mobile device after the successful location update of the outbound roamer's mobile device at VPMN 108, client 106 again initiates the security check process. Client 106 remains disabled at HPMN 102.

In another embodiment of the present invention, RMD 114 observes exchange of some of the parameters, and thereafter RMD 114 provides this exchanged information to gateway 104. When it is found that there has been no exchange of CSI, gateway 104 enables client 106 to request for enabling client 106 to provide CAMEL (or IN) services. For security reasons client 106 is not enabled for each network change. Also, Client 106 remains disabled at HPMN 102. RMD 114 further extracts these parameters from a bearer over which these parameters are exchanged. Gateway 104 obtains these parameters from RMD 114, and stores them in a database associated with gateway 104. Storing these parameters at gateway 104 reduces the communication between gateway 104 and client 106. Some of the parameters are sent only when the current outbound roamer's mobile device is changed after successfully registering with VPMN 108. Some parameters are sent when there is a location change is the outbound roamer's mobile device. The location change can relate to a change in cell ID or a change in location detected by any other means.

Some parameters can be sent per call, for e.g. bearer information to indicate type of call such as a video call or a normal voice call. Some of the parameters can also be obtained without communication between client 106 and gateway 104. In an embodiment of the present invention, client 106 sends a query to the outbound roamer's mobile device to obtain these parameters.

Client 106 and SCP 112 communicate with each other by exchanging CAMEL (or IN) messages via gateway 104. Client 106 encapsulates the CAMEL (or IN) messages over a bearer, and sends them towards gateway 104. Different types of bearers that can be used includes, but are not limited to, an USSD message, an SMS, Supplementary Services (SS) data, General Packet Radio Service (GPRS) data and other future bearer services. In an embodiment of the present invention the future bearer services includes $3^{rd}$ Generation Partnership Project (3GPP) bearers (e.g. IP, SIP, Wimax, IMS, Long Term Evolution (LTE) etc). Gateway 104 upon receiving the encapsulated CAMEL (or IN) messages over the bearer de-capsulates them, and then relays them to SCP 112. Further, when gateway 104 receives CAMEL (or IN) messages from SCP 112 over the same or different bearer, gateway 104 encapsulates the received messages and then relays them to client 106. In one embodiment of the present invention, gateway 104 sends the encapsulated CAMEL (or IN) messages to client 106 over a bearer-A (say USSD), which is different from a bearer-B (say SMS) over which gateway 104 receives the CAMEL (or IN) messages from client 106.

Figure 2:
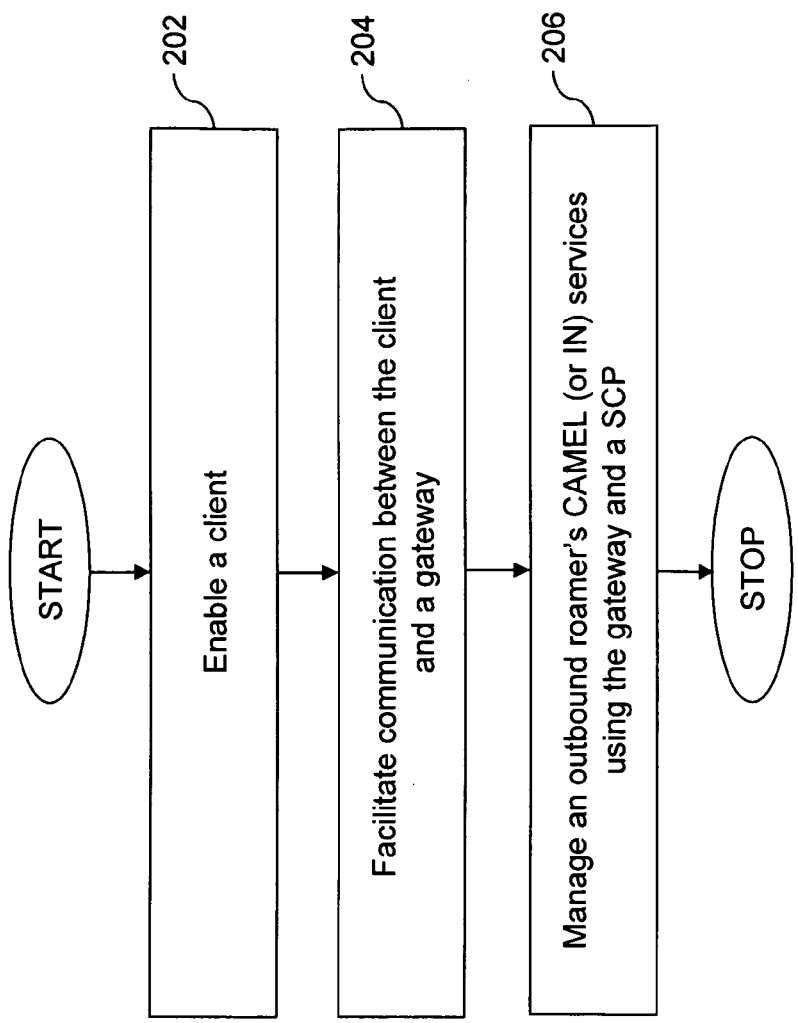
FIG. 2 illustrates a flowchart for providing CAMEL (or IN) services to the outbound roamer of the HPMN, in accordance with an embodiment of the present invention.

In order to provide CAMEL (or IN) services to the outbound roamer, gateway 104 needs to facilitate the communication between client 106 and SCP 112. FIG. 2 illustrates a flowchart for providing CAMEL (or IN) services to the outbound roamer of HPMN 102, in accordance with an embodiment of the present invention. At step 202, gateway 104 enables CAMEL client 106 when gateway 104 checks with RMD 114 that there has been no exchange of the service subscription information between HPMN 102 and VPMN 108. The absence of such an exchange of the service subscription information indicates that either there is no CAMEL (or IN) agreement or no CAMEL (or IN) support between HPMN 102 and VPMN 108. So gateway 104 can then enable client 106. In another embodiment of the present invention, gateway 104 enables client 106 when VMSC/VLR 118 of VPMN 108 does not provide CAMEL (or IN) services to the outbound roamer despite having CAMEL (or IN) support/agreement.

After client 106 is enabled (or verified), gateway 104 facilitates the communication between client 106 and SCP 112 at step 204. Client 106 encapsulates CAMEL (or IN) messages over a bearer and sends these encapsulated messages to gateway 104. Gateway 104 de-capsulates the received CAMEL (or IN) messages over the bearer and translates them in a protocol that is compatible with SCP 112. In one embodiment of the present invention, gateway 104 translates the de-capsulated messages in a protocol that is compatible with the service node. In another embodiment of the present invention, when HPMN 102 supports CAMEL (or IN) protocol and has SCP 112, gateway 104 translates CAMEL Application Protocol (CAP) protocol to the IN protocol. In another embodiment of the present invention, when HPMN 102 does not support CAMEL (or IN) protocol and has the service node, gateway 104 translates the CAP protocol to an ISUP protocol. Once the CAMEL (or IN) messages are translated, at step 206, gateway 104 and SCP 112 collectively manage the outbound roamer's CAMEL (or IN) services by updating the outbound roamer's traffic control conditions. The outbound roamer's traffic control conditions include dynamic enforcement of call barring, dynamic removal of call barring, dynamic routing of calls and messages, and dynamic termination of calls, in accordance with an embodiment of the present invention.

Figure 3A:
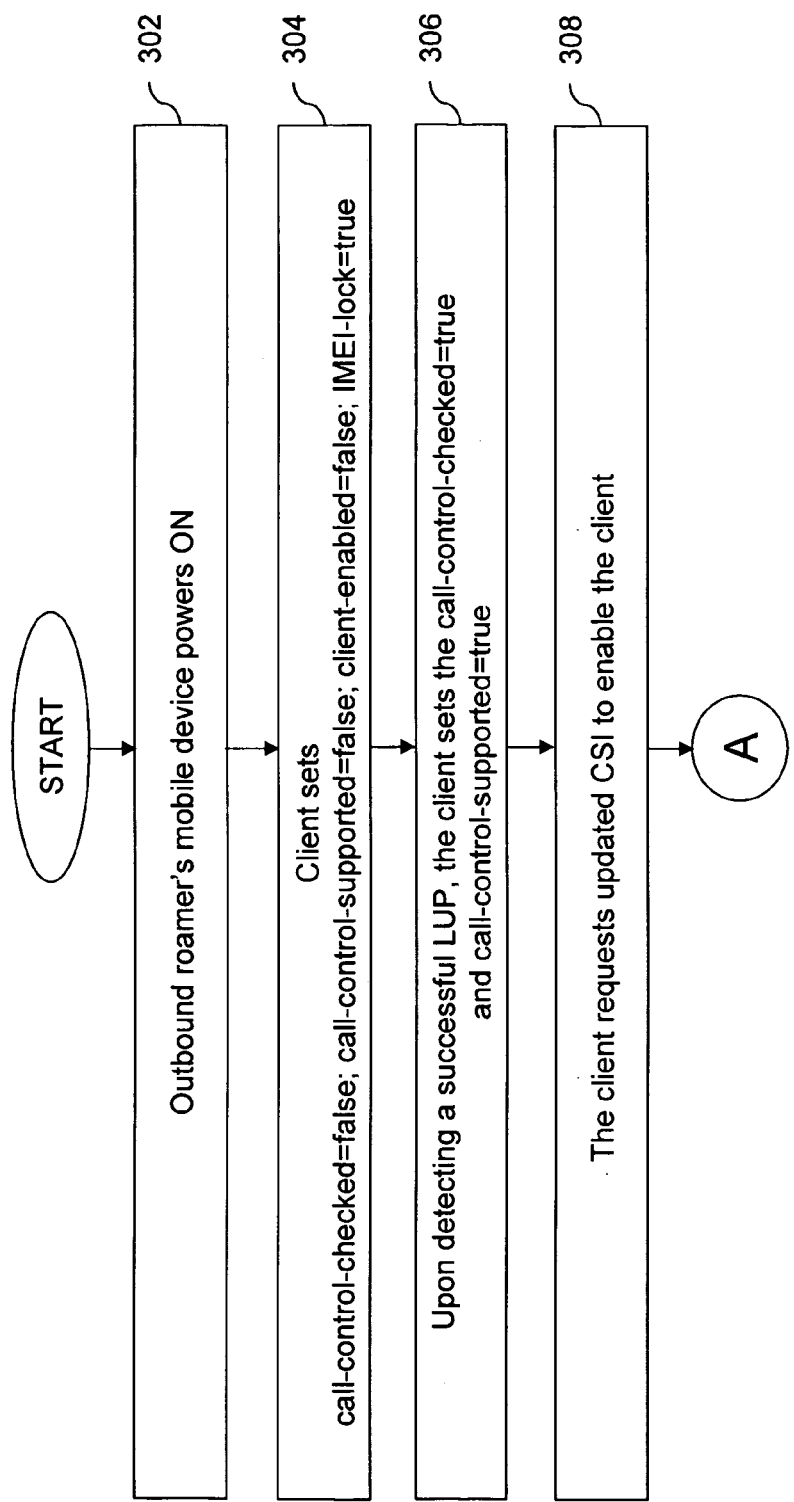
FIGS. 3A and 3B illustrate a flowchart for enabling a client on the outbound roamer's mobile device, in accordance with an embodiment of the present invention.
Figure 3B:
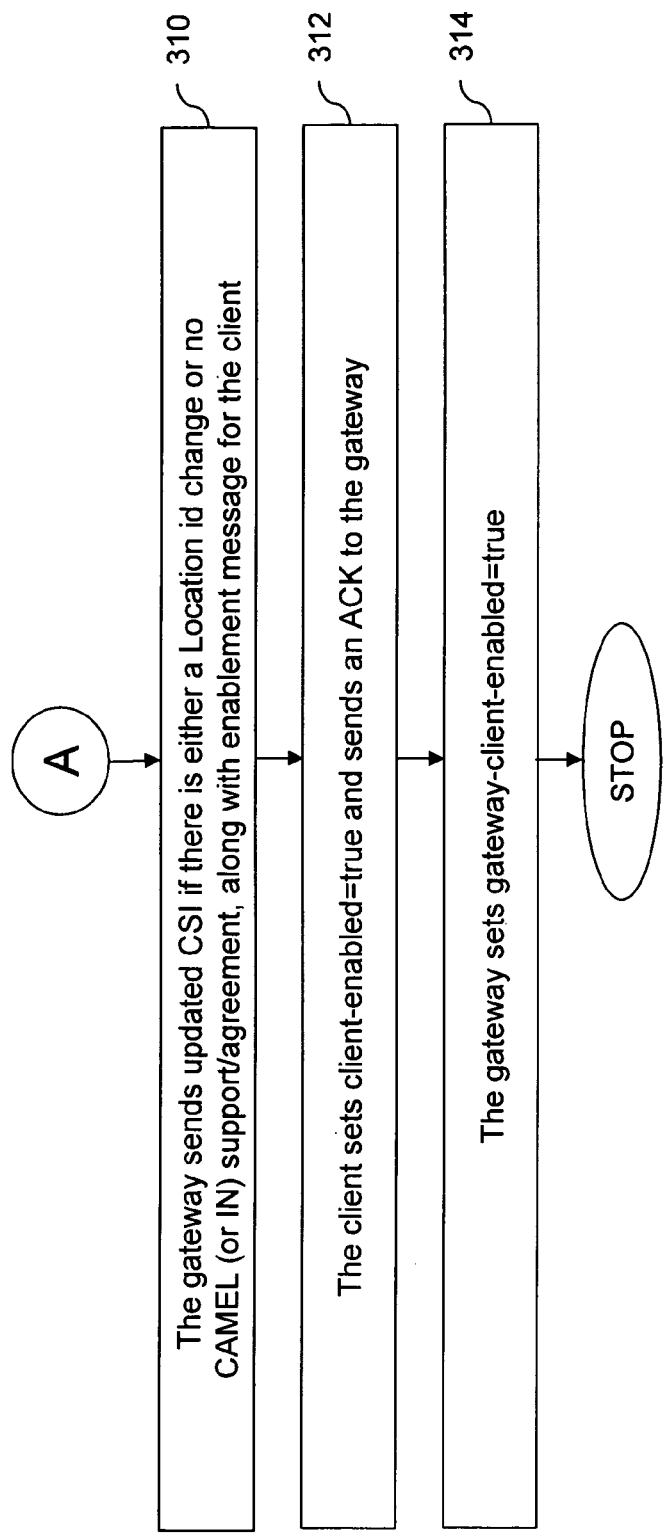

As explained earlier, in order to provide CAMEL (or IN) services to the outbound roamer of HPMN 102, gateway 104 needs to enable client 106. FIGS. 3A and 3B illustrate a flowchart for enabling client 106 on the outbound roamer's mobile device, in accordance with an embodiment of the present invention. At step 302, the outbound roamer roaming in VPMN 108, switches ON his mobile device and attempts to register with VPMN 108. Client 106 is configured to monitor the power ON event, in accordance with an embodiment of the present invention. When client 106 observes the power ON event of the outbound roamer's mobile device, it sets some Boolean variables to predefined conditions at step 304. The Boolean variables that are set include call-control-checked=false, call-control-supported=false, client-enabled=false. The Boolean variables call-control-checked and the call-control-supported define the ability of the outbound roamer's mobile device to pass control of the call and the messages to client 106 when there is an MO call or an MO SMS or an MO SS. The outbound roamer's mobile device also supports messages such as 'Send USSD', 'Send call', 'Send SMS' and 'Send SS' capabilities. The outbound roamer's mobile device also supports reporting of 'call disconnected' and 'call connected' events to client 106. Some of these capabilities might not be required. Gateway 104 can dynamically determine the right application logic for client 106, based on the outbound roamer's mobile device capabilities. For example, if the outbound roamer's mobile device does not support 'Send USSD', but supports Send SMS', then 'Send SMS' will be used by client 106. Another application logic that gateway 104 may use is that if the outbound roamer's mobile device does not support 'Call Answer' and 'Call Disconnected' events then routing the call control via gateway 104. This may be done when the outbound roamer is prepaid outbound roamer.

In another embodiment of the present invention, when client 106 is the smart phone client application, the outbound roamer's mobile device does not need to have the call control capability as the calls are made directly from the client application (i.e., not from the outbound roamer's handset's normal call-making apparatus). Hence, when the outbound roamer's mobile device switches ON, client 106 sets the client-enabled=false. In an embodiment of the present invention the checking of capabilities of outbound roamer's mobile device, after the outbound roamer's mobile device powers ON, is performed at each successful location update of the outbound roamer's mobile device at VPMN 108 and after it is enabled by gateway 104. In another embodiment of the present invention, the checking of capabilities of outbound roamer's mobile device is performed when the outbound roamer's mobile device has been changed since its last successful registration with VPMN 108 and verification by gateway 104.

A Boolean variable IMEI-lock is defined by HPMN 102 and its value can be changed by gateway 104. When the outbound roamer's mobile device switches ON, the Boolean variable IMEI-lock is set to true at step 304. In other words, the IMEI is locked with the outbound roamer's mobile device when there is a communication between client 106 and gateway 104 for the first time.

Thereafter, at step 306, when the outbound roamer's mobile device successfully registers with VPMN 108, client 106 sets the Boolean variables 'call-control-checked' and 'call-control-supported' as true. Thereafter, at step 308, client 106 requests gateway 104 for any updated CSI so as to enable client 106 to communicate with SCP 112. Since this request is sent to gateway 104, it is encapsulated as a CAMEL (or IN) message and sent over a bearer.

Once the request message is received, gateway 104 interacts with RMD 114 to check whether there is any location change or if there is CAMEL (or IN) support/agreement between HPMN 102 and VPMN 108. When a location change of the outbound roamer's mobile device is found, and there is no CAMEL (or IN) support/agreement between HPMN 102 and VPMN 108, gateway 104, at step 310, sends an instruction to client 106 along with the updated CSI to enable the communication between client 106 and SCP 112 via gateway 104. In another embodiment of the present invention, when either there is no location change or there exists CAMEL (or IN) support/agreement between VPMN 108 and HPMN 102, gateway 104 sends an instruction to disable client 106.

Thereafter, at step 312, client 106 sets the Boolean variable client-enabled as true and sends an acknowledgement to gateway 104. The acknowledgement message is also encapsulated over the same bearer or a different bearer. Finally, at step 314, gateway 104 upon receiving the acknowledgement message sets a Boolean variable gateway-client-enabled as true. In an embodiment of the present invention, when gateway 104 sends the instruction to disable client 106, client 106 sets the Boolean variable client-enabled as false, and then sends a corresponding acknowledgement to gateway 104. Gateway 104 upon receiving the acknowledgement message sets the Boolean variable gateway-client-enabled as false.

As discussed earlier, the CSI can be used to enable client 106. In an embodiment of the present invention, gateway 104 fetches the CSI from HLR 116 and stores in its database. The CSI stored at HLR 116 is an Originating CSI (O-CSI) associated with the outbound roamer, in accordance with an embodiment of the present invention. Gateway 104 fetches the CSI from HLR 116 in advance of every time client 106 activates and requests gateway 104 for any updated CSI. Gateway 104 retrieves CSI from HLR 116 by sending signaling messages such as, but not limited to, a Mobile Application Part (MAP) RestoreData, a fake LUP and a Send Routing Information (SRI) query to HLR 116. In an embodiment of the present invention, the CSI is predefined at the time of subscription of the CAMEL (or IN) services for the outbound roamer. In case gateway 104 stores the CSI, client 106 need not store the CSI. When client 106 exchanges messages with gateway 104, the IMSI (or similar identifier) of the outbound roamer can be used to select the corresponding CSI at gateway 104. The CSI stored at gateway 104 is identified by the outbound roamer's IMSI, in accordance with an embodiment of the present invention. In one embodiment of the present invention, gateway 104 stores multiple CSI profiles depending upon the CAMEL (or IN) services requested by client 106. The examples of different types of CSI profiles include, but are not limited to, an SMS-CSI profile for SMS service and a call CSI (e.g., O-CSI in case of MO call) profile for call usage.

In another embodiment of the present invention, gateway 104 can fetch the CSI at each successful location update of the outbound roamer at VPMN 108 based on some criteria and when there is no CSI sent from HPMN 102 to VPMN 108 and the outbound roamer is a Camel Everywhere service subscriber. Gateway 104 may also fetch the CSI at the time of subscription of the Camel Everywhere service or at any time HLR 116 has changed the CSI for the outbound roamer. The criteria guide subsequent fetches of the CSI from HLR 116. The criteria can be network changes or a configurable interval or pre-defined number of location updates.

In another embodiment of the present invention, client 106 stores a pseudo-CSI having a structure similar to the O-CSI. This pseudo CSI is encoded in a format that is suitable for storage in client 106. In one embodiment of the present invention, this pseudo CSI acts as reference pointer to the actual CSI stored at gateway 104. In an embodiment of the present invention, the pseudo CSI includes a service key, a Global System for Mobile communication (GSM) Service Control Function (gsmSCF) address, a logical criteria and a default call handling logic. The service key refers to particular application logic on SCP 112. The gsmSCF address is the address of SCP 112. The logical criterion refers to conditions that need to be satisfied when a call is made to a called party, in order to trigger communication with gateway 104. The default call handling logic is the action that occurs when an error occurs while communicating with gateway 104.

In an embodiment of the present invention, the Boolean variable client-enabled is always set to true, in order to avoid location change event not being reported to the client 106. In this case it is considered that the outbound roamer's mobile device supports call control, and hence each time the outbound roamer's initiates the MO call, the call control is passed to client 106. Client 106 on receiving the call control first communicates with gateway 104 to check the enablement status of client 106 at gateway 104. When it is observed that client 106 is disabled at gateway 104, client 106 does not send any MO call status to gateway 104.

Figure 4A:
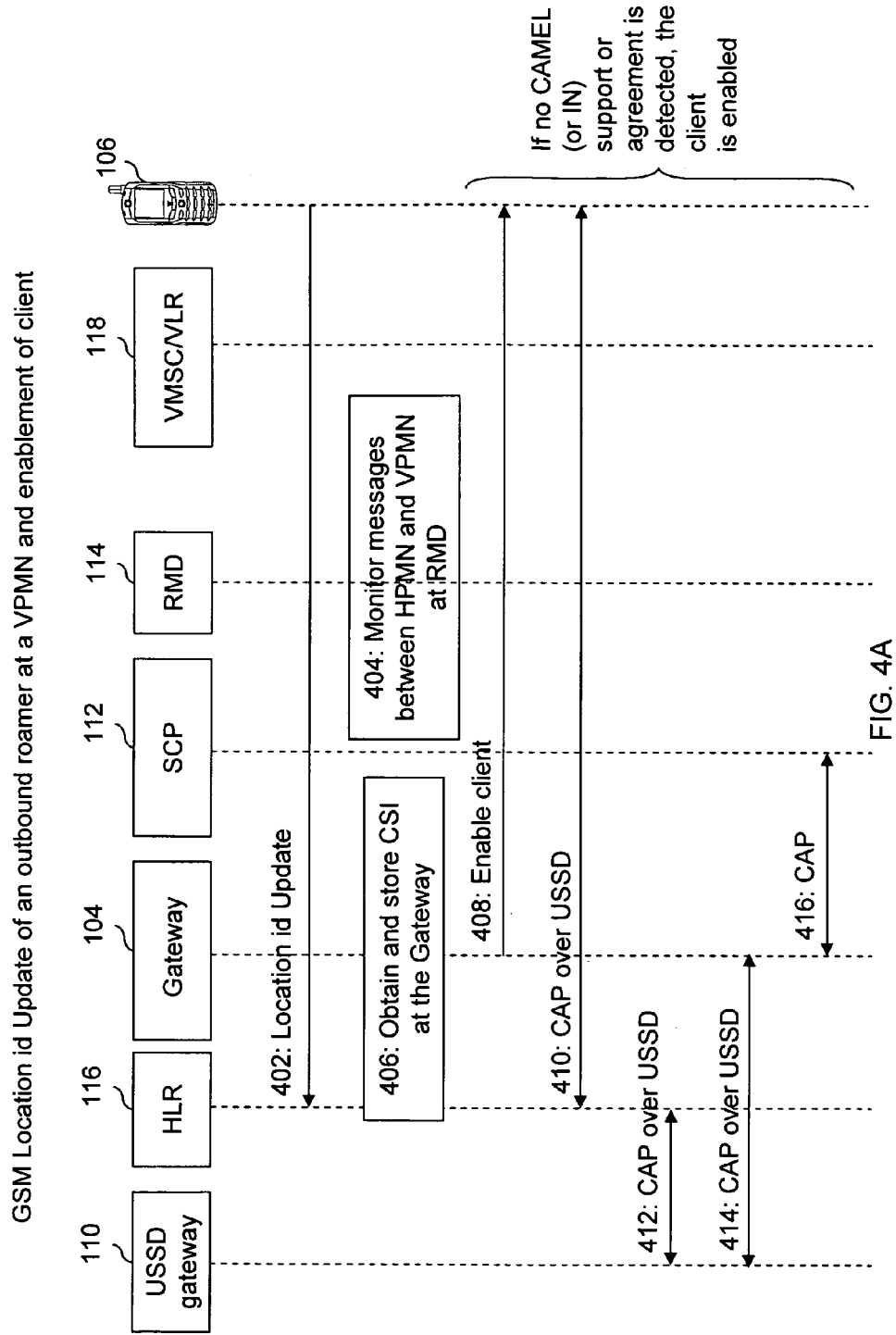
FIGS. 4A and 4B illustrate a flow diagram for detecting the outbound roamer's registration at a Visited Public Mobile Network (VPMN) and enabling the client to communicate with a gateway associated with the HPMN, in accordance with an embodiment of the present invention.
Figure 4B:
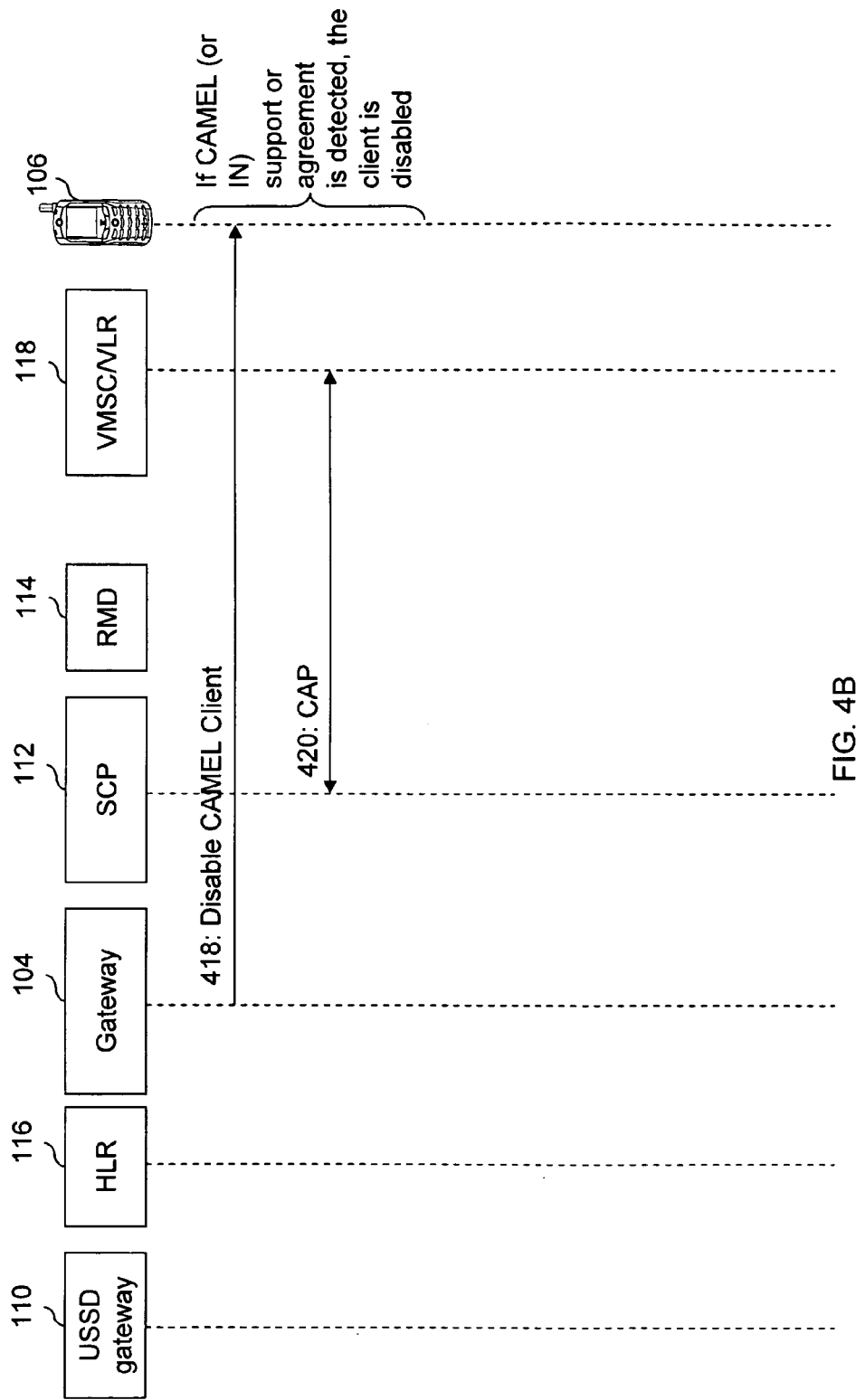

Once client 106 has been enabled, client 106 communicates with gateway 104 for every call control message via the CAP protocol over the bearer. FIGS. 4A and 4B illustrate a flow diagram for detecting the outbound roamer's registration at VPMN 108 and enabling the client 106 to communicate with gateway 104, in accordance with an embodiment of the present invention. The outbound roamer's mobile device makes a registration attempt at VPMN 108, hence at step 402, VMSC/VLR 118 sends the LUP to HLR 116. It will apparent to a person skilled in the art that during the registration of the outbound roamer's mobile device with VPMN 108 various other MAP messages, such as Insert Subscriber Data (ISD), ISD-ACK and LUP-ACK are exchanged between HLR 116 and VMSC/VLR 118.

Upon detecting the successful LUP, RMD 114 at step 404 monitors the exchange of various messages between HPMN 102 and VPMN 108. In an embodiment of the present invention, RMD 114 detects exchange of encapsulated messages over the bearer between client 106 and gateway 104. Gateway 104 communicates with RMD 114 to obtain the status of the CAMEL (or IN) support/agreement between VPMN 108 and HPMN 102. Thereafter at step 406, gateway 104 obtains and stores the CSI information. Gateway 104 retrieves CSI either from RMD 114 when CSI is detected or from HLR 116 by using signaling messages such as, but not limited to, Mobile Application Part (MAP) RestoreData, by sending a fake LUP, and a Send Routing Information (SRI) query to HLR 116.

In case the status indicates no CAMEL (or IN) support/agreement, gateway 104 enables client 106 at step 408 Thereafter, client 106 communicates with gateway 104 using CAP messages encapsulated over the USSD bearer via HLR 116 and USSD gateway 110. So at step 410, client 106 encapsulates the CAP message over USSD bearer and sends it to HLR 116. Then HLR 116 relays the encapsulated CAP message to USSD gateway 110 over the USSD bearer, at step 412. Furthermore, at step 414 USSD gateway 110 sends IP the encapsulated message to gateway 104 using IP. Next, at step 416, gateway 104 de-capsulates the encapsulated message received over the USSD bearer to extract the CAP message and relays the CAP message to SCP 112.

When gateway 104 sends the CAP message to SCP 112, gateway 104 receives a response (e.g., an acknowledgement message) from SCP 112. In an embodiment of the present invention, when gateway 104 is deployed between SCP 112 and USSD gateway 110, gateway 104 sends the CAP message to SCP 112 with a Calling Party Address (CgPA) as a GT of gateway 104. This is done to ensure that SCP 112 returns response to gateway 104. Although gateway 104 uses its own address as the CgPA in an SCCP message communication with SCP 112, the parameters of the SCCP message will incorporate actual VLR/VMSC address, the calling party number, the called number, the cell location, actual location of the outbound roamer and bearer information. Some of these parameters like the VLR/VMSC address are obtained and stored at gateway 104 via RMD 114. Other parameters like the cell id and bearer information are obtained via client 106. Some of the parameters like time-zone, call reference, calling party category, event type BCSM are stored by gateway 104, while parameters like service key) are filled by the CSI stored at gateway 104. Gateway 104 further obtains the response message (i.e. the CAP message) from SCP 112, and then encapsulates the response message over the USSD bearer before sending it to USSD gateway 110 over the IP protocol. Thereafter, USSD gateway 110 sends the response message to HLR 116, which relays the encapsulated response message over the USSD bearer back to client 106.

Alternatively, in another embodiment of the present invention, in case RMD 114 detects a CAMEL (or IN) support/agreement between HPMN 102 and VPMN 108, gateway 104 disables client 106, at step 418. Once client 106 is disabled, direct communication between SCP 112 and various components in VPMN 108 occurs using the CAP messages as shown at step 420.

It will be apparent to a person skilled in the art that the USSD bearer is usually free of cost. However, some Public Mobile Networks (PMNs) do not support USSD out of a desire, for example, to avoid the USSD call back since it causes a loss in roaming revenue. Similarly, the SS service is also usually not charged. In an embodiment of the present invention, HPMN 102 operator configures HLR 116 for an unknown SS code to send the SS request to gateway 104, and thus the SS code is used to encapsulate the CAMEL (or IN) messages. Alternatively, HPMN 102 operator may use the SMS as the bearer. Moreover, it will be apparent to a person skilled in the art that the MO SMS in roaming are normally charged, whereas the Mobile Terminated (MT) SMS are free of cost. Therefore, when the SMS is used as the bearer for CAMEL (or IN) messages, in order to avoid MO SMS roaming charges, client 106 uses gateway 104 as a Short Message Service Centre (SMSC) for sending encapsulated CAMEL (or IN) messages. In an embodiment of the present invention, client 106 cannot change the SMSC address to gateway 104's address. In such a case all MO-SMS (e.g. SCCP messages destined for the SMSC address) are intercepted by gateway 104. In another embodiment of the present invention, when gateway 104 receives the encapsulated messages, it sends a negative acknowledgement to client 106 despite receiving the encapsulated messages successfully. In an embodiment of the present invention, client 106 uses a special short code to denote that the MO SMS is intended for gateway 104. Thus with different bearer options available, gateway 104 and client 106 can select any of these bearers. A network operator can always have a preferred bearer and other alternate bearers, and use the alternate bearer in case the preferred one is unavailable.

Figure 5:
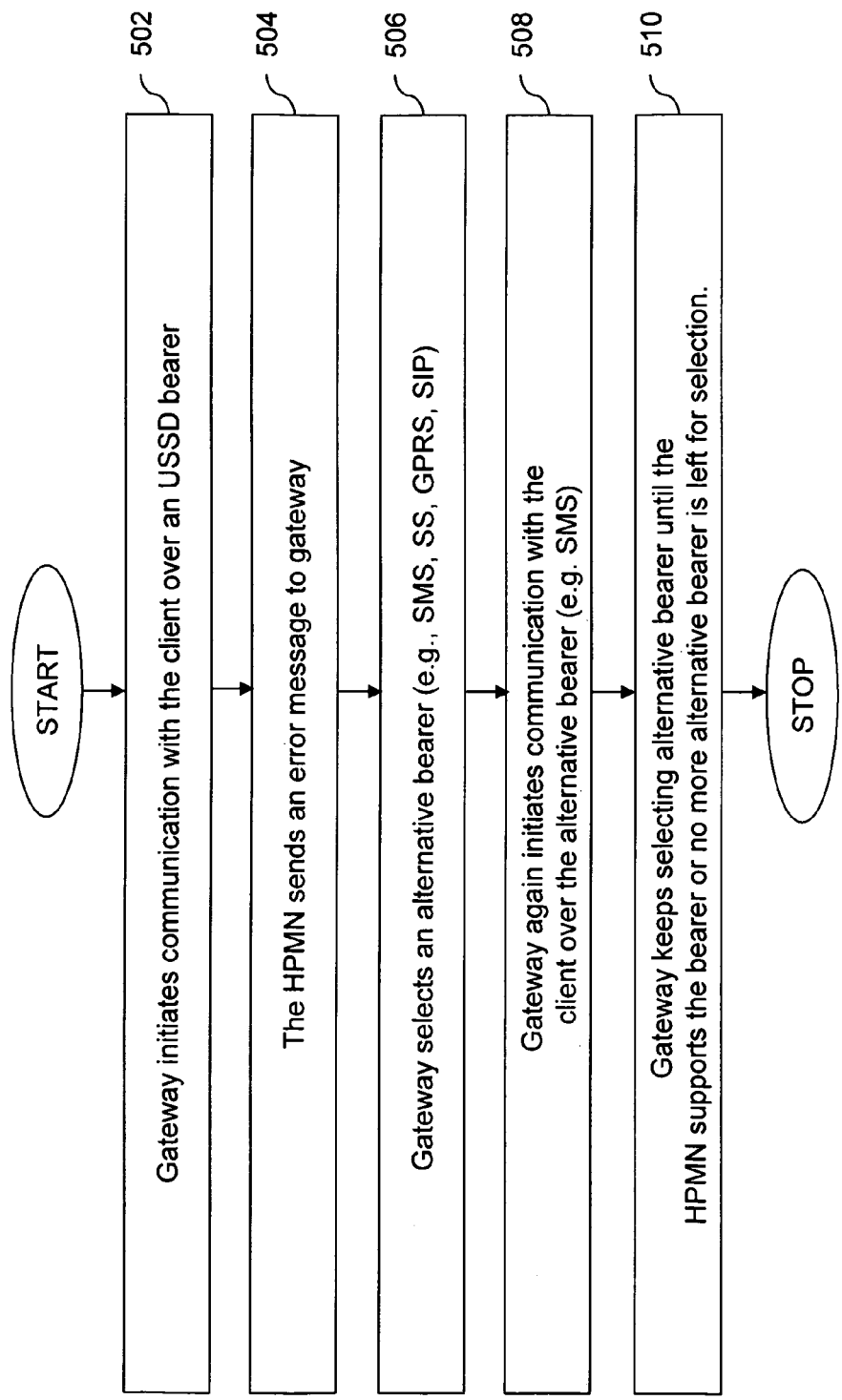
FIG. 5 illustrates a flowchart for selecting an alternate bearer by the gateway when a preferred bearer is not supported by the HPMN, in accordance with an embodiment of the present invention.
Figure 6B:
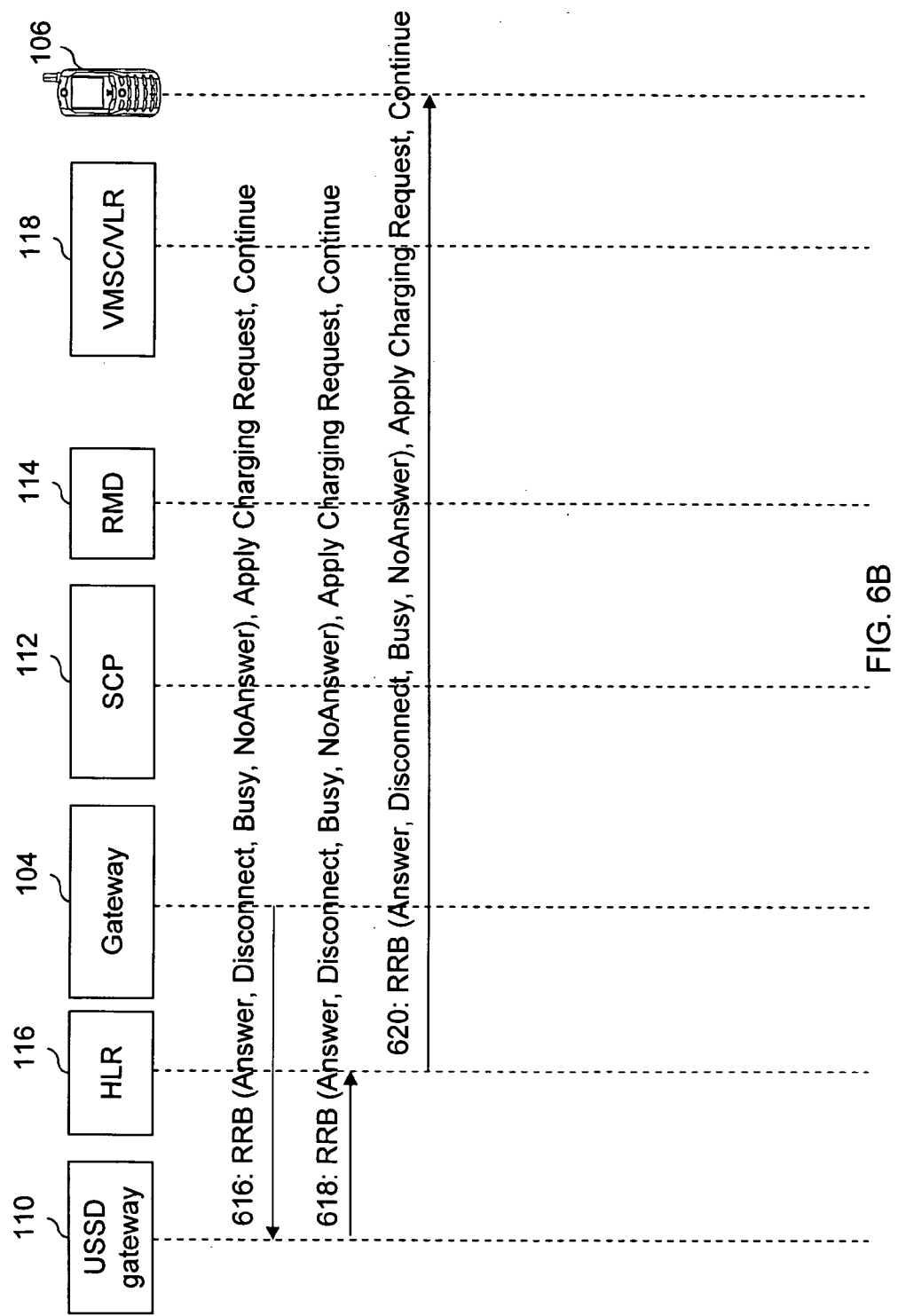
Figure 6C:
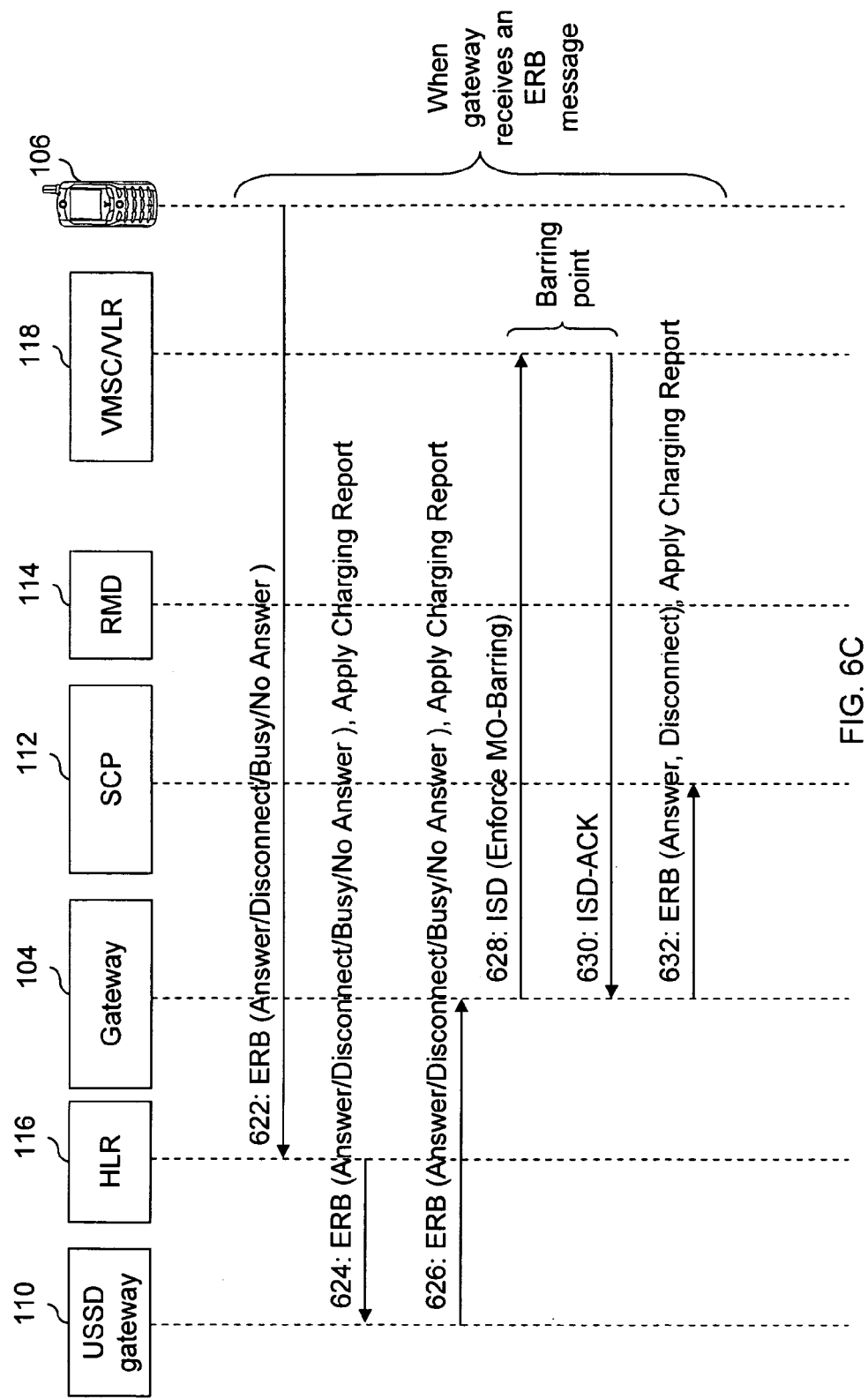
Figure 6D:
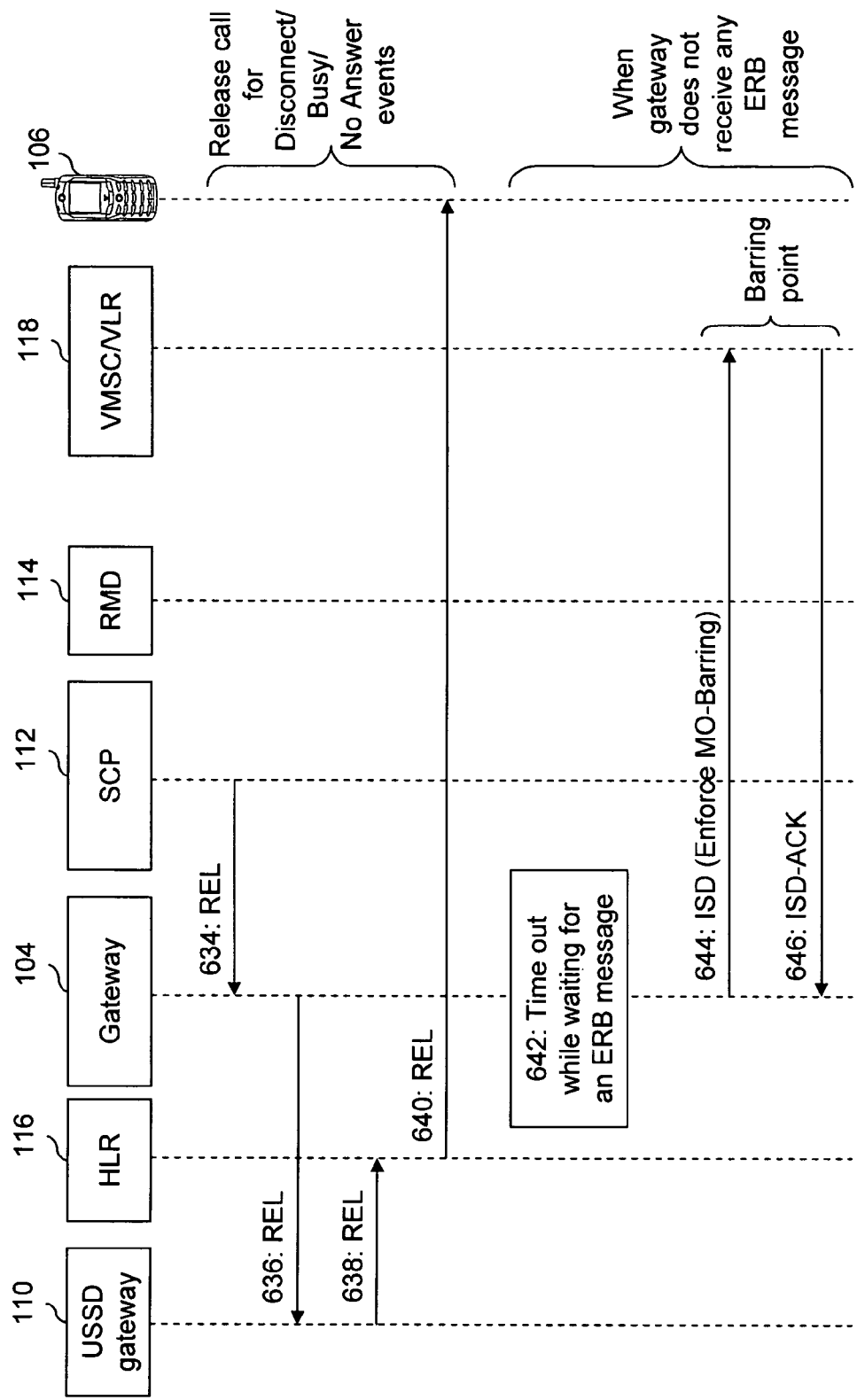

FIG. 5 illustrates a flowchart for selecting an alternate bearer by gateway 104 when the preferred bearer is not supported by HPMN 102 in accordance with an embodiment of the present invention. At step 502, gateway 104 initiates communication with client 106 by using USSD as the preferred bearer for encapsulating the CAMEL (or IN) messages. In case HPMN 102 does not support USSD as the preferred bearer, HPMN 102 sends an error message to gateway 104, at step 504.

The examples of the error message may include, but are not limited to, "facility not supported", "not supported" and "bearer not supported". On receiving such an error message, gateway 104 selects an alternative bearer, at step 506. The alternative bearer can be either SMS, the SS, the GPRS, the SIP (Voice over IP) or any other data bearer available. After selecting the alternative bearer, gateway 104 once again initiates the communication with client 106 over the selected alternative bearer, at step 508. In an embodiment of the present invention, in case HPMN 102 supports the alternative bearer, gateway 104 continues communicating with the selected alternative bearer. Otherwise, in another embodiment of the present invention, in case HPMN 102 does not support the selected alternative bearer, gateway 104 continues to select other alternative bearers until HPMN 102 support the selected bearer or no more alternative bearers are left for selection, as shown at step 510.

In yet another embodiment of the present invention, client 106 selects the alternative bearer when VPMN 108 does not support the preferred bearer selected by client 106. The selection process of the alternative bearer is similar to that explained above in conjunction with FIG. 5, except that in this embodiment client 106 instead of gateway 104 selects the alternative bearer.

Further, gateway 104 and client 106 may require different bearers for communication. In an embodiment of the present invention where client 106 is the STK application, the outbound roamer's mobile device does not support MT USSD messages. In such a scenario, gateway 104 uses a bearer (e.g. MT SMS) that is different from the bearer (e.g. USSD) used by client 106. In other words, different bearers in different directions can be used. For example, gateway 104 uses USSD bearer to send encapsulated messages to client 106, while client 106 uses SMS bearer to send the return path encapsulated messages to gateway 104. In an embodiment of the present invention when a smart phone client application is used, client 106 can choose to listen only MT SMS from a particular Short Message Entity (SME) address (e.g. from gateway 104) so that normal MT SMS does not get affected by client 106.

In various embodiments of the present invention, HPMN 102 operator ensures secured communication between gateway 104 and client 106. In one embodiment of the present invention, the communication between gateway 104 and client 106, is encrypted using a shared secret key, PKI exchange or other encryption technique. In other words, gateway 104 and client 106 encrypt the messages that they exchange with each other. In an embodiment of the present invention, the shared secret key or PKI keys can be dedicated for client 106 and is associated with the outbound roamer's IMSI. In another embodiment of the present invention, gateway 104 sends the shared secret key to client 106 when it first communicates with client 106. Client 106 can store this shared secret key or other encryption information. That stored encryption information can allow client 106 and gateway 104 to perform encryption and decryption of the encapsulated CAMEL (or IN) messages over the bearer.

In an embodiment of the present invention, HPMN 102 operator ensures security by maintaining at gateway 104 a subscriber database containing the IMSI, the IMEI, the shared secret key, the PIN, the cell ID and the location information of the outbound roamer's mobile device. The security mechanism is mainly targeted at the prepaid outbound roamers as these roamers are barred from initiating MO calls and messages when they are roaming in VPMN 108. HPMN 102 operator configures the security mechanism to avoid SIM cloning, and to avoid changing of outbound roamer's mobile device to some computer device that may modify the outbound called numbers to some premium numbers.

In an embodiment of the present invention, HPMN 102 operator defines and configures the level of security. In an embodiment of the present invention, the IMEI associated with the outbound roamer's mobile device is locked between gateway 104 and client 106. Using this IMEI locking mechanism, HPMN 102 operator assures that it is providing services the outbound roamer on his mobile device that was used for subscribing to CAMEL (or IN) services initially. Hence, the outbound roamer needs to inform HPMN 102 about any change of his mobile device and get a new IMEI lock corresponding to his new mobile device. In another embodiment of the present invention, HPMN 102 operator binds the outbound roamer's IMSI and the IMEI with when the outbound roamer's mobile device communicates with gateway 104 for the first time. In an embodiment of the present invention, gateway 104 verifies the outbound roamer's IMSI and the IMEI each time client 106 communicates with gateway 104. This is done by matching the received IMSI and the IMEI with the IMSI and the IMEI stored at gateway 104's database.

Other security mechanisms include routing calls back to HPMN 102 with call control signaling via gateway 104 (hereinafter referred as home routing approach), and making call back to the outbound roamer without removing any call barring (hereinafter referred as call back approach) both are described later. Since call back approach is secure and cheaper method for handling calls of prepaid outbound roamers, it generates additional revenue for HPMN 102's operators. As compared to a normal USSD call back, this call back approach referred above allows using normal phone book and thus provides normal dialing experience. However, even in this call back approach the outbound roamer needs to answer similar to the case of the USSD call back.

The home routing approach is also secure since gateway 104 can control the MO call in this case too. However, home routing approach is unable to avoid/counter a sophisticated fraud done using a computer to set up a concurrent call with another called number in addition to the one routed to HPMN 102. But since call barring is removed in the home routing approach for a very short duration (e.g. 1 sec), the chances for such frauds diminish.

Using the above described security mechanisms HPMN 102 operator is able to control MO calls and messages of its outbound roamers. The outbound roamer can be a prepaid subscriber, hereinafter interchangeably referred to as prepaid outbound roamer, or he can be a postpaid subscriber, hereinafter interchangeably referred to as postpaid outbound roamer. In an embodiment of the present invention, when the prepaid outbound roamer registers with VPMN 108 that has no CAMEL (or IN) support/agreement with HPMN 102 and the HPMN 102 supports CAMEL (or IN) protocol, HPMN 102 operator restricts the prepaid outbound roamer to register with VPMN 108. In order to do so, HLR 116 sends MO barring conditions in the outbound roamer's profile to VMSC/VLR 118. The MO barring conditions include, but are not limited to, Operator Determined Barring (ODB) and Call Barring (CB). HLR 116 sends a Roaming Not Allowed (RNA) message to VMSC/VLR 118 of the prepaid outbound roamer during his registration attempt at VPMN 108. In order to enable CAMEL (or IN) services for the prepaid outbound roamer in VPMN 108, gateway 104 changes the RNA response to an ODB response, which is then sent to the prepaid outbound roamer's VMSC/VLR 118. Since ODB does not restrict the prepaid outbound roamer to register with VPMN 108, the prepaid outbound roamer is able to register successfully with VPMN, and therefore can also avail CAMEL (or IN) services in VPMN 108.

As discussed earlier, gateway 104 and SCP 112 control the MO calls and messages of the prepaid and postpaid outbound roamer of HPMN 102. The calls of the prepaid and postpaid outbound roamers are initially barred when these outbound roamers register with VPMN 108 since VPMN 108 does not have CAMEL (or IN) support/agreement. When the MO call is initiated, gateway 104 removes MO call barring of the prepaid and postpaid outbound roamers, for a limited time period, upon observing exchange of parameters between gateway 104 and client 106. Thereafter, gateway 104 re-enforces barring of MO calls when the prepaid roamer runs out of prepaid balance or when gateway 104 does not receive requested event reports or progress reports in a configured time interval. FIGS. 6A, 6B, 6C and 6D illustrate a flow diagram for the handling of MO call by the prepaid outbound roamer in VPMN 108, in accordance with an embodiment of the present invention. The prepaid outbound roamer, hereinafter interchangeably referred to as a calling party A, calls a B number, hereinafter interchangeably referred to as a called party number B. Hence at step 602, client 106 present in VPMN 108 sends an encapsulated Initial Detection Point (IDP) message over the USSD bearer to HLR 116. This IDP message comprises a pseudo CSI service key as prepaid, the prepaid outbound roamer's IMSI, the calling party number A, the called party number B and the location id of the prepaid outbound roamer (A) in VPMN 108. The pseudo CSI service key helps gateway 104 to identify the outbound roamer as the prepaid outbound roamer of HPMN 102, in accordance with an embodiment of the present invention. HLR 116 then relays the received encapsulated IDP message to USSD gateway 110, at step 604.

As explained earlier, many of the parameters in this IDP messages may also be stored at the gateway 104. Thereafter, at step 606, gateway 104 receives the encapsulated IDP message from HLR 116, and de-capsulates the received IDP message over the USSD bearer. After comparing and verifying the prepaid outbound roamer's IMSI received in the IDP message with the IMSI stored at gateway 104's database, gateway 104 at step 608, sends a stand-alone MAP ISD message with a parameter 'remove MO barring' to VMSC/VLR 118, in order to remove the MO barring of calls. Thereafter, at step 610, VMSC/VLR 118 sends an acknowledgement message, such as an ISD-ACK to gateway 104. Gateway 104 then sends the de-capsulated IDP message to SCP 112, at step 612. At step 614, SCP 112 issues Request Reports (RRB) over CAP protocol to gateway 104, for events like 'call answered', 'call disconnected', 'call busy', 'call no answer' and 'call continue'. Finally, at steps 616 to 620, gateway 104 encapsulates the RRB message over the USSD bearer, and then issues it to client 106 via USSD gateway 110 and HLR 116.

Once receiving the RRB message, client 106 sends event reports to gateway 104. At step 622, client 106 issues event reports encapsulated over the USSD bearer, such as, 'call answered', 'call disconnected', 'call busy', and 'call no answer' to HLR 116. Thereafter, at step 624, USSD gateway 110 receives the encapsulated event reports from HLR 116. Gateway 104 then receives the event reports from USSD gateway 110 over the USSD bearer, at step 626. After de-capsulating the event reports, gateway 104, at step 628, issues another stand alone MAP ISD message with a parameter 'enforce MO-Barring' to VMSC/VLR 118, in order to re-enforce the barring of MO calls by the prepaid outbound roamer in VPMN 108, based on the received event reports. In an embodiment of the present invention, when an event report for 'call answered' is received at gateway 104, it issues the stand alone MAP ISD to VMSC/VLR 118 so as to re-enforce the barring of MO calls. In this case, the MO barring in the ISD messages is configured not to terminate the ongoing call but impose MO barring once the call is disconnected. In another embodiment of the present invention, when an event report for 'call disconnect' is received at gateway 104, it issues the stand alone MAP ISD to VMSC/VLR 118, in order to re-enforce the barring of MO calls if the MO barring was not performed at the 'call answered' event.

In yet another embodiment of the present invention, when 'no answer' event report or 'call busy' event report is received at gateway 104, it re-enforces the barring of MO calls. For every MAP ISD message sent to VMSC/VLR 118, gateway 104 receives an acknowledgement message, such as ISD-ACK from VMSC/VLR 118, at step 630.

Thereafter, at step 632, gateway 104 relays the ERB message with event reports to SCP 112. SCP 112 upon receiving the call answer event report starts deducting balance from the prepaid outbound roamer's prepaid account. SCP 112 stops deducting balance upon receiving the 'call disconnect' event. Thereafter, at step 634, SCP 112 issues a call Release (REL) command towards gateway 104 to release the call, in case it receives 'call disconnect', 'call busy' and 'call no answer' events. At step 636, gateway 104 encapsulates the REL command over the USSD bearer, and relays the encapsulated REL command to USSD gateway 110. USSD gateway 110 then relays the encapsulated REL command to HLR 116, at step 638. Finally at step 640, client 106 receives the encapsulated REL command from HLR 116 over the bearer, and thus releases the ongoing call.

In an embodiment of the present invention, gateway 104 does not receive the event reports periodically from client 106. In order to handle such situations, gateway 104 also stores different capabilities of the prepaid outbound roamer's mobile device. The examples of these capabilities include, but are not limited to, refresh support, call control support, USSD support, SMS support and events handling. In an embodiment of the present invention, when client 106 does not support reporting of the events, gateway 104 requests client 106 to periodically report events like MO and MT 'call answered' and 'call disconnect'. Whenever gateway 104 does not receive such periodic event reports from client 106, Gateway 104 terminates the call by sending commands for call termination to VMSC/VLR 118. The call termination commands could be such as, but not limited to, cancel location and Immediate Service Termination (IST).

In another embodiment of the present invention, HPMN 102 operator configures a time-out timer deployed at gateway 104 to start when the MAP IDP for the prepaid outbound roamer is received at gateway 104. In one case the time out timer can also be set by the Apply Charging IN command from SCP 112. As shown at step 642, gateway 104 waits for the ERB message for a configurable time out period. When no event report is received at gateway 104 within the time-out interval, gateway 104 enforces MO barring by sending the stand alone MAP ISD with the parameter 'Enforce MO-Barring' to VMSC/VLR 118, at step 644. VMSC/VLR 118 acknowledges the ISD, and hence at step 646, VMSC/VLR 118 sends an ISD-ACK message to gateway 104.

SCP 112 issues the REL command to gateway 104, in order to release the ongoing call. The call is released as per the steps 634 to 640 explained above. In an embodiment of the present invention SCP 112 initiates the REL command to avoid prepaid fraud like not receiving event reports and when the prepaid balance is low.

In another embodiment of the present invention, when the outbound roamer is the postpaid outbound roamer, the call flow remains same except the following changes in one or more messages. The IDP message received at HLR 116 (i.e., at step 602) consists of a pseudo CSI service key that indicates the outbound roamer as the postpaid outbound roamer, in addition to the calling party's IMSI, the calling party number A, the called party number B and the location ID of the postpaid outbound roamer in VPMN 108. However, in this case of postpaid outbound roaming, gateway 104 issues the stand alone MAP ISD message, at step 608, to VMSC/VLR 118 with a parameter 'remove BOIC-Ex-Home-Barring', that is for Barring all Outgoing International Calls Except Home (BOIC-Ex-Home). Similarly, upon receiving an ERB message from USSD gateway 110 (i.e., at step 620), gateway 104 issues another stand alone MAP ISD message with a parameter 'enforce BOIC-Ex-Home-Barring' to VMSC/VLR 118, in order to re-enforce the BOIC-Ex-Home barring, based on the received event reports in the ERB message. Rest of the call flow for the MO call by the postpaid outbound roamer is similar to that of the MO call by the prepaid outbound roamer as described above in conjunction with FIGS. 6A to 6D.

In another embodiment of the present invention, gateway 104 terminates the ongoing call by sending commands for call termination to VMSC/VLR 118 if VMSC/VLR 118 supports dynamic termination of calls. Gateway 104 further flags the prepaid outbound roamer's IMSI as fraud, and thereby black lists the prepaid outbound roamer from using the CAMEL (or IN) services. In an embodiment of the present invention, gateway 104 maintains a list of known VLRs that support dynamic termination of calls. Based on this knowledge, gateway 104 applies a routing logic to decide which MO calls should be routed through HPMN 102 when the VLR is not supporting dynamic termination of the calls.

The prepaid outbound roamers can do different types of frauds with HPMN 102 operator. In an embodiment of the present invention, in order to avoid the prepaid fraud, HPMN 102 operator establishes a two way callback. In such a case, the barring of MO calls is not removed, and all the MO calls are controlled at HPMN 102.

In another embodiment of the present invention using the home routing approach (mentioned earlier), HPMN 102 operator routes the MO calls back to HPMN 102 via gateway 104. Gateway 104 bars only international MO calls rather than barring all MO calls, in accordance with an embodiment of the present invention. Gateway 104 enforces this barring using the stand alone MAP ISD command. HPMN 102 GMSC routes all MO international calls and its associated signaling via gateway 104. Gateway 104 then handles the 'call answered' and 'call disconnected' events, in accordance with an embodiment of the present invention. In another embodiment of the present invention, a call made by a fraud outbound roamer on a local number does not route back to HPMN 102. Gateway 104 upon not receiving such a fake call (lets say for a pre-defined time interval) sends commands to terminate the fraud call.

In yet another embodiment of the present invention, in order to avoid the prepaid frauds, gateway 104 issues a MAP Provide Subscriber Information (PSI) command to VMSC/VLR 118 when gateway 104 does not receive the 'call answered' and the 'call disconnected' events from client 106. The MAP PSI command updates the status of the ongoing call at gateway 104. Furthermore, when it is observed that no event reports are received at gateway 104 and the call is still ongoing, gateway 104 issues the commands to VMSC/VLR 118 to terminate the ongoing call.

Figure 7A:
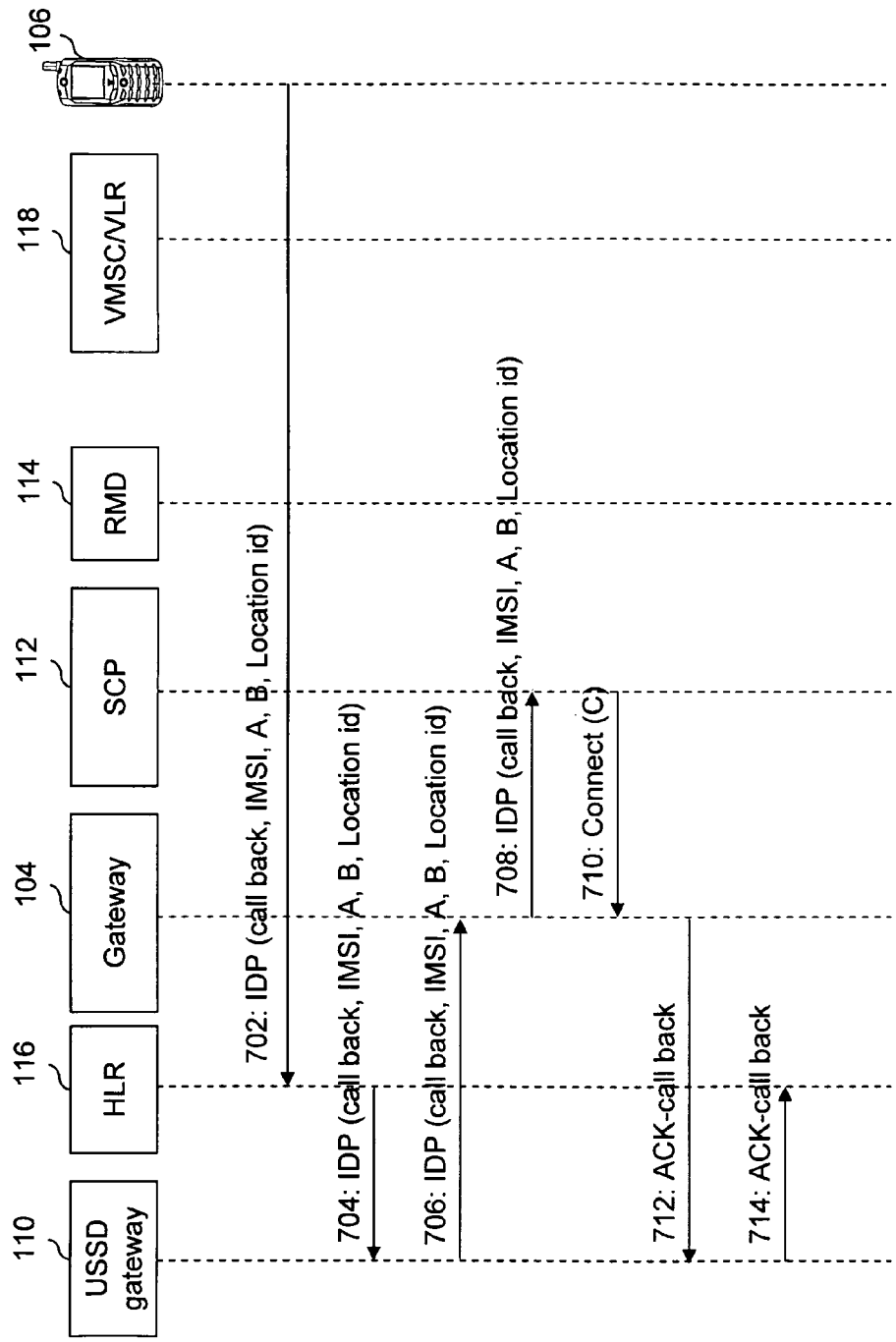
FIGS. 7A and 7B illustrate a flow diagram for enabling MO call by the prepaid outbound roamer using an Unstructured Supplementary Service Data (USSD) call back solution (i.e. the call back approach mentioned earlier), in accordance with an embodiment of the present invention.
Figure 7B:
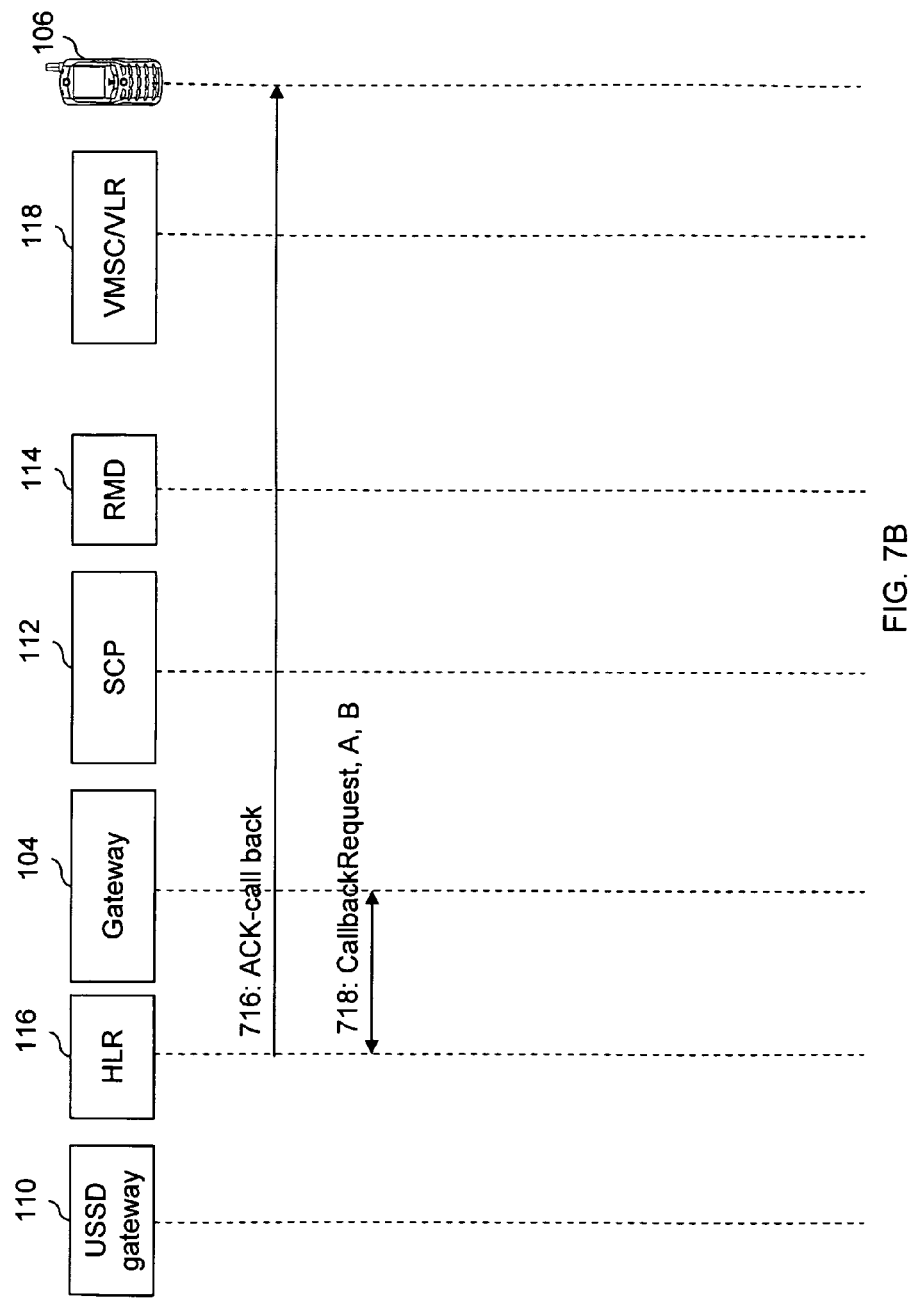

Gateway 104 can use various other approaches to avoid frauds in the outbound prepaid roaming. FIGS. 7A and 7B illustrate a flow diagram for enabling MO call by the prepaid outbound roamer using the USSD call back solution (i.e. the call back approach mentioned earlier), in accordance with an embodiment of the present invention. When the prepaid outbound roamer A makes the MO call to the called party number B, at step 702, HLR 116 receives an encapsulated IDP message over USSD bearer from client 106. This IDP message includes USSD call back request message, the IMSI associated with the prepaid outbound roamer, the calling party number A and the called party number B. Thereafter at step 704, USSD gateway 110 receives the encapsulated IDP message. Thereafter, at step 706 and step 708 gateway 104 receives the encapsulated IDP message, it de-capsulates the IDP message over the USSD bearer and sends it to SCP 112. Gateway 104 responds to the call back request from client 106 by translating the MO call request to the USSD call back request. The USSD call back request is an USSD message to a call back service code associated with HLR 116. This call back service code is configured by HPMN 102 operator to route this USSD call back request to an USSD call back application associated with HPMN 102.

In an embodiment of the present invention, HPMN 102 operator configures gateway 104 to send USSD call back request directly to the USSD call back application. The USSD call back translation is based on an application logic that consists of a combination of HPMN 102 operator's configuration, the called party number B and the prepaid outbound roamer A's preferences. In an embodiment of the present invention, the called party number B is an MSISDN of HPMN 102, hereinafter interchangeably referred to as a connected number Gateway 104 receives a Connect message on the connected number 'C' from SCP 112, as shown at step 710. Gateway 104 then initiates the USSD callback for the connected number 'C'. Hence at steps 712 to 716, gateway 104 sends an acknowledgement for the USSD callback, such as ACK-call back to client 106 via USSD gateway 110 and HLR 116. Since the ACK-call back indicates the call back, the prepaid outbound roamer gets ready to answer the call. Hence at step 718, gateway 104 initiates the call back towards HLR 116. Since the MO call is controlled by HPMN 102 operator, the prepaid fraud is avoided.

In another embodiment of the present invention, when the connected number 'C' is non-HPMN number and VMSC/VLR 118 supports dynamic termination of calls, gateway 104 directly routes the MO call to the called party number B. In yet another embodiment of the present invention, when the connected number 'C' is non-HPMN number, gateway 104 routes the MO call via HPMN 102 for reducing the MO call cost, generating revenues for HPMN 102 operator and offering better services. It will be apparent to a person skilled in the art that by routing the MO call via HPMN 102, HPMN 102 operator earns the call termination revenue.

Figure 8A:
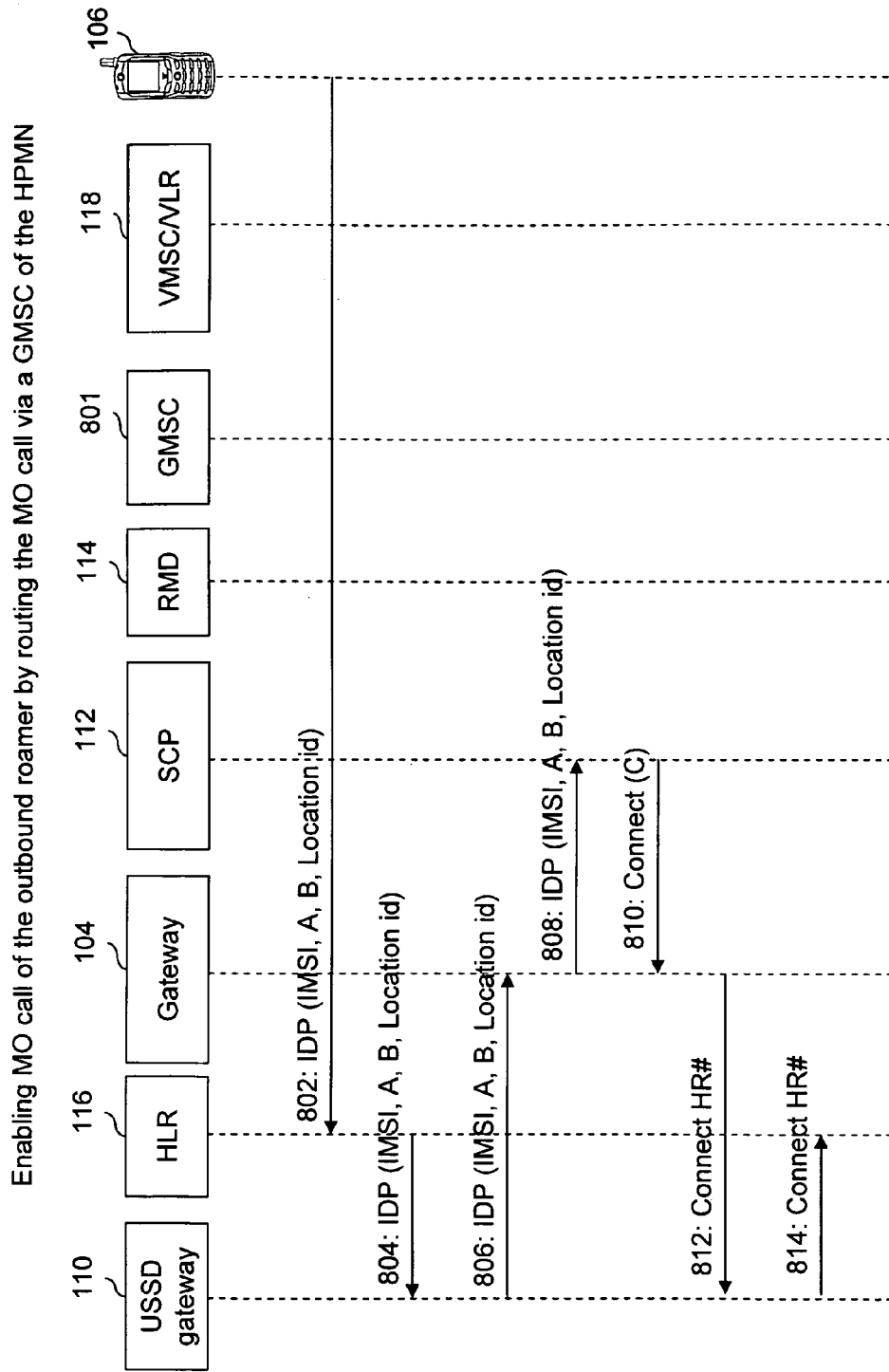
FIGS. 8A and 8B illustrate a flow diagram for routing the MO call by the prepaid outbound roamer through a Gateway Mobile Switching Center (GMSC) in the HPMN, in accordance with an embodiment of the present invention.
Figure 8B:
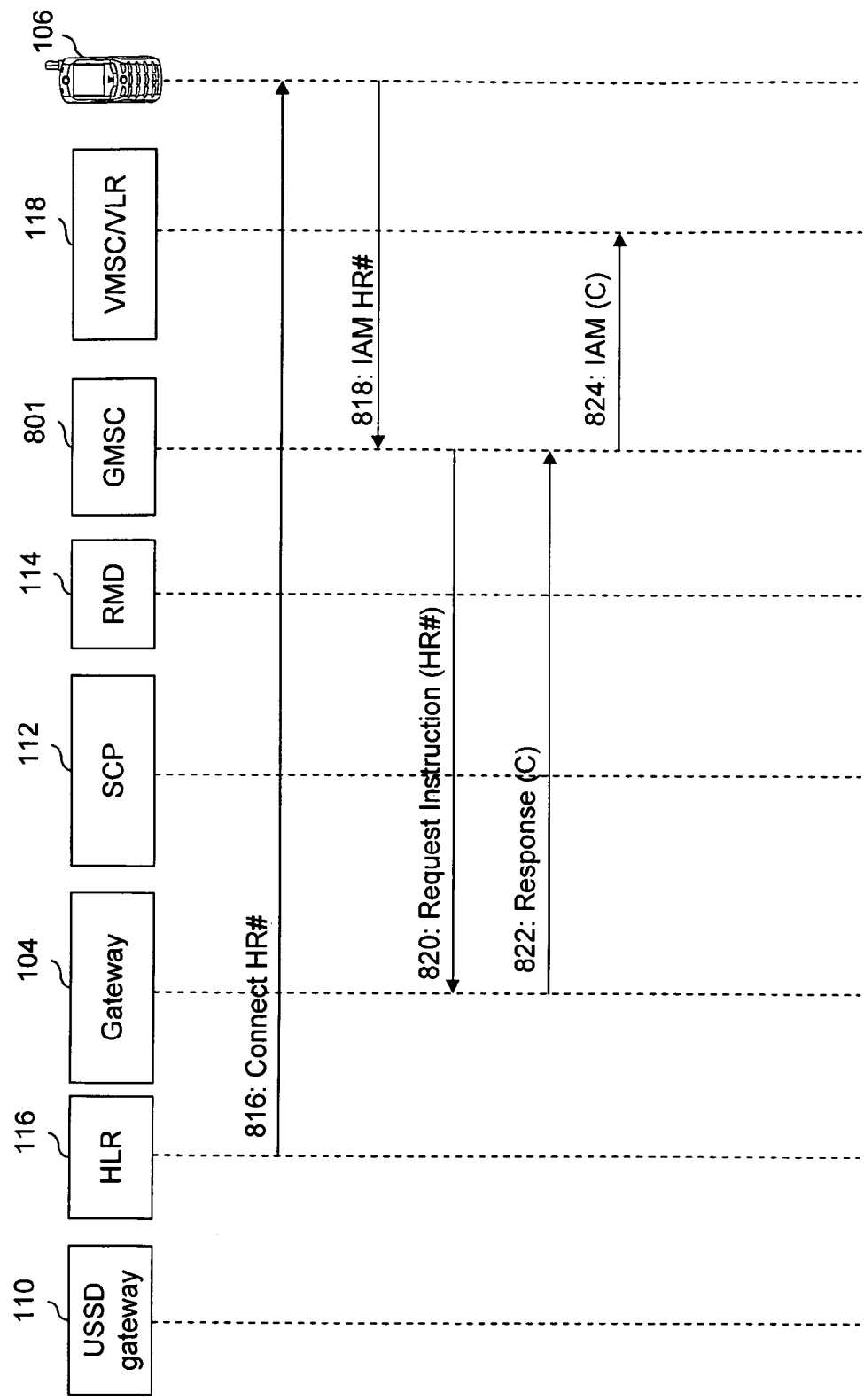

In another embodiment of the present invention, when the connected number 'C' is non-HPMN number and VMSC/VLR 118 does not support dynamic termination of calls, gateway 104 still routes the MO call by the prepaid outbound roamer via HPMN 102. FIGS. 8A and 8B illustrate a flow diagram for routing the MO call by the prepaid outbound roamer through a Gateway Mobile Switching Center (GMSC) 801 in HPMN 102, in accordance with an embodiment of the present invention. When the prepaid outbound roamer A makes the MO call to the called party number B, client 106 sends the IDP message to HLR 116. At step 802, HLR 116 receives an encapsulated IDP message over USSD bearer from client 106. This IDP message includes the IMSI associated with the prepaid outbound roamer, the calling party number A, the called party number B and the location of the prepaid outbound roamer. Thereafter at step 804, USSD gateway 110 receives the encapsulated IDP message. Thereafter, at step 806 and step 808 gateway 104 receives the encapsulated IDP message, it de-capsulates the IDP message over the USSD bearer and sends it to SCP 112. At step 810, gateway 104 receives a Continue or Connect message on the connected number from SCP 112. In an embodiment of the present invention, gateway 104 stores a pool of routing numbers in its database. During routing of the MO call via HPMN 102, gateway 104 selects a routing number HR# from this pool, and then correlates it with the connected number 'C'. Thereafter, at steps 812 to 816, gateway 104 sends the routing number HR# in the Connect message to client 106 via USSD gateway 110 and HLR 116. Upon receiving the routing number HR#, client 106 starts the call back on the HR# towards HPMN 102, and hence at step 818, client 106 sends IAM HR# to GMSC 801. In an embodiment of the present invention, HPMN 102 operator configures GMSC 801 to pass a call control on any routing number to gateway 104 via some call control signaling such as, but not limited to, IN, ISUP and ISUP-loopback. Hence at step 820, GMSC 801 sends a Request Instruction (HR#) message (e.g. IN IDP, or ISUP IAM or SIP etc) to gateway 104. Using the correlation between the routing number HR# and the connected number 'C', gateway 104, at step 822, returns the connected number 'C' in a response message to GMSC 801, so as to route the MO call towards the connected number Finally, at step 824, GMSC 801 sends a call control message, such as IAM on the connected number 'C' to VMSC/VLR 118.

In another embodiment of the present invention, when VMSC/VLR 118 does not support dynamic termination of calls, gateway 104 forces the STK based client 106 to terminate the ongoing MO call. In one embodiment of the present invention, the STK based client 106 uses a 'Refresh' command to terminate the ongoing call. The refresh command can be INITIALIZE or RESET.

In another embodiment of the present invention, the STK based client 106 sets up a fake call on a fake number. This fake call will be a fake emergence call as defined by an Emergence Call Code (ECC) file in the SIM of the prepaid outbound roamer's mobile device. Client 106 stores this ECC code in a file. When STK based client 106 makes a fake emergence call while the MO call is ongoing, the termination of the fake call first terminates the ongoing MO call. Also, many types of outbound roamer's mobile device do not prompt the prepaid outbound roamer to interact with the fake emergence call.

In yet another embodiment of the present invention, the STK based client 106 terminates the ongoing call by setting up a polling interval. In an embodiment of the present invention, HPMN 102 operator configures the polling interval to be 1 millisecond. This polling triggers the outbound roamer's mobile device to send a polling request to client 106. The outbound roamer's mobile device uses a command 'STK FETCH' to poll client 106, in accordance with an embodiment of the present invention. In an embodiment of the present invention, when such polling occurs, client 106 returns an error message, and thus the outbound roamer's mobile device terminates the ongoing call. In another embodiment of the present invention, when such polling occurs, client 106 ignores the polling request, and thus the outbound roamer's mobile device terminates the ongoing call.

Alternatively, in order to provide better CAMEL (or IN) services to the outbound roamer registered with VPMN 108, HPMN 102 operator certifies and publishes a list of outbound roamer's mobile devices that support call control. Also, when client 106 is STK based, HPMN 102 operator can reduce the prepaid fraud by replacing the SIM for the prepaid outbound roamer. Usually, the existing SIM of the prepaid outbound roamer does not have enough space to load client 106. Hence, HPMN 102 operator provides a new SIM with client 106 to the prepaid outbound roamer, in accordance with an embodiment of the present invention. While giving the new SIM, HPMN 102 operator verifies and records the IMSI of the prepaid outbound roamer, and thereby reduces fraud.

In an embodiment of the present invention, when client 106 is the smart phone client application, HPMN 102 operator reduces fraud by deploying a verification process to check for the prepaid outbound roamer's IMSI. For example, the verification process can be a credit card payment done for downloading the smart phone client application.

HPMN 102 operator also faces a risk from call forwarding during prepaid roaming. When gateway 104 removes the MO call barring upon observing the service key, another incoming call to the prepaid outbound roamer may trigger uncharged call forwarding. So in one embodiment of the present invention, in order to help avoid this risk, HPMN 102 operator disables the call forwarding for the prepaid outbound roamer. In other embodiment of the present invention, gateway 104 blanks out the call forwarding status or a call forwarding number of the prepaid outbound roamer, each time the prepaid outbound roamer's mobile device registers with VPMN 108. The blank out is achieved by sending a stand alone MAP ISD message to client 106 from gateway 104 after the successful LUP of the outbound roamer's mobile device at VPMN 108.

Furthermore, the CAMEL (or IN) services can also be provided to postpaid outbound roamers of HPMN 102. It will be apparent to a person skilled in the art that postpaid roaming is less prone to fraud as compared to prepaid roaming. The communication between client 106 and gateway 104 in case of postpaid roaming is same as that explained earlier for the prepaid roaming. Hence, whenever client 106 takes the call control for postpaid outbound roamer, it sends CAMEL (or IN) messages encapsulated over the bearer to gateway 104. The CAMEL (or IN) messages include IDP message. Also, the IDP message includes parameters such as, but not limited to, the calling party's IMSI, the calling party number A, and the called party number B. Gateway 104 de-capsulates the CAMEL (or IN) message over the bearer, and verifies the postpaid outbound roamer's IMSI. After the postpaid outbound roamer successfully registers with VPMN 108, and client 106 is enabled; gateway 104 sends the de-capsulated CAMEL (or IN) messages to SCP 112. The called party number B for the postpaid outbound roamer can be either a Virtual Private Network (VPN) number, a short-code or a misdialed number. SCP 112 then applies translation logic on the called number, and then passes the response to gateway 104. Gateway 104 then encapsulates the response in the bearer, and then sends it to client 106.

Gateway 104 can also dynamically control the SMS of the outbound roamers of HPMN 102. In an embodiment of the present invention, when client 106 is STK based, the outbound roamer's mobile device should support transfer of SMS control to client 106. Thus, when the outbound roamer sends an SMS, the MO SMS is relayed through client 106. In another embodiment of the present invention, when client 106 is the smart phone application, the MO SMS relays through client 106 application.

Since client 106 takes the control of the MO SMS, client 106 communicates with gateway 104 via CAMEL (or IN) messages encapsulated over the bearer. Gateway 104 de-capsulates the CAMEL (or IN) messages over the bearer, and then relays the de-capsulated CAMEL (or IN) messages to an SMS SCP. The SMS SCP changes an SMSC address and a destination number to its own address in its response to client 106. Thus, the MO SMS encapsulated over the bearer, relayed via client 106 reaches SMS SCP 112 first, before it goes to the SMSC for the final delivery. By changing the address of the SMSC, HPMN 102 operator is able to deduct the charges from the outbound roamer's prepaid or postpaid account before relaying the MO SMS to the SMSC for the final delivery.

Gateway 104 also supports some IN/CAP commands such as, but not limited to, 'Apply Charging', 'Reset Timer', 'Continue', 'Call Information Request', 'Cancel' etc. These commands are translated into corresponding protocols between client 106 and gateway 104. For example, as mentioned earlier, 'Apply Charging' is used to set an interval for client 106 to periodically report back its call progress status. 'Reset timer' for client 106 to wait longer for gateway 104's side operation to complete. 'Cancel' to instruct client 106 to cancel all event reporting. 'Call Information Request' to instruct client 106 to record call duration.

Gateway 104 also supports some IN/CAP commands such as, but not limited to, 'Furnish Charging Information', 'Connect To IVR', 'Play Announcement', 'Prompt For Collect Information' and other similar kinds of commands. These commands are beneficial to a GMSC associated with VPMN 108, in accordance with an embodiment of the present invention. Gateway 104 handles such commands without involving client 106. In another embodiment of the present invention, gateway 104 does not entertain such commands. In yet another embodiment of the present invention, gateway 104 handles the 'Furnish Charging Information' command by executing this command to store Call Detail Records (CDR) at gateway 104. Similarly, for commands like 'Play Announcement' and 'Prompt For Collect Information', gateway translates these commands to an equivalent which is recognized by client 106. In another embodiment of the present invention, gateway 104 handles 'Play Announcement' and 'Prompt For Collect Information' by mapping them to a user interface request for the outbound roamer to enter information for exchanging with HPMN 102 via gateway 104.

Further, gateway 104 and client 106 reduce the traffic over SS7 links between HPMN 102 and VPMN 108. In an embodiment of the present invention, client 106 sends selected messages to gateway 104. For example, when no location change of the outbound roamer is observed, gateway 104 uses previously noted information about the outbound roamer to insert in the missing parameters when relaying messages to SCP 112 instead of again querying for the location information from client 106. In another embodiment of the present invention, HPMN 102 operator configures gateway 104 to send only those messages that are recognized by client 106. These messages include, but are not limited to, calling number/generic number and service interaction indicators. Additionally, HPMN 102 operator configures gateway 104 to send only those messages coming from SCP 112 to client 106, which are supported by client 106. In an embodiment of the present invention, gateway 104 stores such messages in its database, and it initiates call backs of the calls from HPMN 102. When the call is routed from HPMN 102, gateway 104 executes these messages, and then sends the response to SCP 112.

Furthermore, HPMN 102 operator handles the billing for its prepaid and postpaid outbound roamers differently. HPMN 102 operator identifies its prepaid outbound roamers using its HPMN 102 billing system. Also, the TAP records from VPMN 108 for prepaid outbound roamers are dropped from the retail billing process. HPMN 102 operator is benefited by the CAMEL (or IN) services as it receives real time retail billing. The wholesale bill settlement between HPMN 102 and VPMN 108 occurs based on their mutual agreement for the billing. Hence, in order to correctly handle retail billing, when HPMN 102 routing is not used for the prepaid outbound roamer, the retail billing of the MO calls and messages is done on the connected number (i.e., corresponding to the called party number). Alternatively, when HPMN 102 routing is used, then the special routing number (like HR#) assigned by SCP 112 or gateway 104, is used by HPMN 102 billing system or HPMN 102 Data Clearing House. This is used in order to filter and extract VPMN 108 TAP records to be reconciled with SCP 112 generated CDR, to produce the originally dialed number for retail billing and bill presentation.

In order to handle the billing of the postpaid outbound roamers, HPMN 102 billing system observes the correlation or translation initiated at client 106. The correlation or translation is identified by HPMN 102 numbers such as, but not limited to, customer care, voicemail corresponding to the short codes and the VPN numbers. In case of correlation, HPMN 102 billing system adds corresponding meaningful description in the retail bill presentation. In case of translation, the outbound roamer is able to correlate it with the dialed VPN.

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, gateway 104 and client 106 will have a separate SS7 and network interfaces, corresponding to both the HPMN and FPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |

-continued

| GSM MAP | ANSI-41D |
| --- | --- |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

An HPMN operator uses one or more variations of the present invention to enable support of CAMEL (or IN) services for an outbound roamer of an HPMN, in a VPMN. The HPMN can provide CAMEL (or IN) services to the outbound roamer when the HPMN and the VPMN are unable to support either exchange of CAMEL (or IN) messages or have a CAMEL (or IN) agreement. This compels more and more outbound roamers to roam in the VPMNs and avail the CAMEL (or IN) services. Additionally, the invention helps the HPMN operators to reduce prepaid and postpaid frauds that can occur due to manipulations of a client associated with the outbound roamer's mobile device or outbound roamer's mobile device itself (e.g. SIM cloning, or prepaid outbound roamers using computer injection of calls with the SIM). The invention helps HPMN operators to dynamically control the MO calls and messages of the outbound roamers. Additionally, depending upon HPMN network capabilities for different types of telecommunication protocols, the invention can also perform protocol conversion from CAP to IN to ISUP etc.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, enables support of IN services for the outbound roamer of an HPMN by enabling a client that is coupled to the outbound roamer's mobile device based on observation of exchange of one or more parameters with a gateway. The client is enabled upon detecting a successful location update of the outbound roamer in a VPMN and by exchanging encapsulated IN messages with the gateway over one or more bearers. The gateway is deployed in the HPMN. Moreover, the HPMN and the VPMN are unable to support either exchange of IN messages or an IN agreement. The computer program product further includes a computer usable program code for facilitating communication between the client and an HPMN service node, or the client and an HPMN SCP, via the gateway. The gateway facilitates communication by translating the encapsulated IN messages, exchanged with the client, in a protocol that is compatible with either the service node or the SCP. The computer program product further includes a computer usable program code for managing the outbound roamer's IN services using the gateway and one of the HPMN service node and the HPMN SCP, by updating the outbound roamer's one or more traffic control conditions at the client, based on recognition of the exchanged encapsulated IN messages.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for enabling support of CAMEL (or IN) services for an outbound roamer at a VPMN and associated with an HPMN, when the HPMN and the VPMN are unable to support either exchange of CAMEL (or IN) messages or an CAMEL (or IN) agreement. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
|---|---|
| 3G | Third generation of mobile |
| ANSI-41 | American National Standards Institute #41 |
| ATI | Any Time Interrogation |
| BCSM | Basic Call State Model |
| BSC | Base Station Controller |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CgPA | Calling Party Address |
| CLI | Calling Line Identification |
| CSD | Circuit Switched Data |
| CSI | Camel Subscription Information |
| DPC | Destination Point Code |
| ERB | CAP Event Report Basic call state model |
| FPMN | Friendly Public Mobile Network |
| FTN | Forward-To-Number |
| GLR | Gateway Location Register |
| GMSC | Gateway MSC |
| GPRS | General Packet Radio System |
| GPS | Global Positioning System |
| GSM | Global System for Mobile |
| GSM SSF | GSM Service Switching Function |
| gsmSCF | GSM Service Control Function |
| GT | Global Title |
| GTT | Global Title Translation |
| HLR | Home Location Register |
| HPMN | Home Public Mobile Network |
| IAM | Initial Address Message |
| IDP | Initial DP IN/CAP message |
| IMS | IP multimedia subsystem |
| IMSI | International Mobile Subscriber Identity |
| IN | Intelligent Network |
| INAP | Intelligent Network Application Part |
| INE | Interrogating Network Entity |
| IP | Internet Protocol |
| ISD | MAP Insert Subscriber Data |
| ISG | International Signal Gateway |
| ISTP | International STP |
| ISUP | ISDN User Part |
| IVR | Interactive Voice Response |
| LU | Location Update |
| LUP | MAP Location Update |
| LTE | Long Term Evolution |
| MAP | Mobile Application Part |
| MCC | Mobile Country Code |
| MCC | Mobile Country Code |
| ME | Mobile Equipment |
| MGT | Mobile Global Title |
| MMS | Multimedia Message Service |
| MMSC | Multimedia Message Service Center |
| MNC | Mobile Network Code |
| MO | Mobile Originated |
| MSC | Mobile Switching Center |
| MSISDN | Mobile Station International Subscriber Directory Number |
| MSRN | Mobile Station Roaming Number |
| MT | Mobile Terminated |
| ODB | Operator Determined Barring |
| OTA | Over The Air |
| PRN | MAP Provide Roaming Number |
| PSI | MAP Provide Subscriber Information |
| RNA | Roaming Not Allowed |
| RR | Roaming Restricted due to unsupported feature |
| RRB | CAP Request Report Basic call state model |
| SCCP | Signal Connection Control part |
| SCP | Signaling Control Point |
| SCF | Service Control Function |
| SG | Signaling Gateway |
| SIP | Session Initiation Protocol |
| SSF | Service Switch Function |
| SIM | Subscriber Identity Module |
| SME | Short Message Entity |
| SMS | Short Message Service |
| SMSC | Short Message Service Center |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| STK | SIM Tool Kit Application |
| STP | Signal Transfer Point |
| USSD | Unstructured Supplementary Service Data |
| VAS | Value Added Service |
| VLR | Visited Location Register |
| VMSC | Visited Mobile Switching Center |
| VPMN | Visited Public Mobile Network |
| WiMax | Worldwide Interoperatability for Microwave access |
| WAP | Wireless Access Protocol |

TECHNICAL REFERENCES

Each of which is Incorporated by Reference Herein

GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 or 3GPP 23078 on CAMEL
Digital cellular telecommunications system (Phase 2+)
Customized Applications for Mobile network Enhanced Logic (CAMEL) Phase 2
GSM 978 on CAMEL Application protocol
Digital cellular telecommunications system (Phase 2+)
Customized Applications for Mobile network Enhanced Logic (CAMEL)
CAMEL Application Part (CAP) specification
(GSM 09.78 version 7.1.0 Release 1998)
Signalling procedures and the Mobile Application Part (MAP)
(Release 1999)
GSM 379 on CAMEL Support of Optimal Routing (SOR)
GSM 318 on CAMEL Basic Call Handling
Q1214-Q1218 on Intelligent Networks
Q701-704 on SS7 MTP
Q711-Q714 on SS7 SCCP
Q760-Q769 on SS7 ISUP
ITU-T Recommendation Q.1214 (1995), Distributed functional plane for intelligent network CS-1.
ITU-T Recommendation Q.1218 (1995), Interface Recommendation for intelligent network CS-1.
ITU-T Recommendation Q.762 (1999), Signaling system No. 7 ISDN user part general functions of messages and signals.
ITU-T Recommendation Q.763 (1999), Signaling system No. 7—ISDN user part formats and codes.
ITU-T Recommendation Q.764 (1999), Signaling system No. 7—ISDN user part signaling procedures.
ITU-T Recommendation Q.766 (1993), Performance objectives in the integrated services digital network application.
ITU-T Recommendation Q.765 (1998), Signaling system No. 7—Application transport mechanism.
ITU-T Recommendation Q.769.1 (1999), Signaling system No. 7—ISDN user part enhancements for the support of Number Portability.

Jiang 2005 DCG-O: Dynamic Generation of Camel Subscription Information for Outbound roamers

I claim:

1. A method for enabling support of Intelligent Network (IN) services for an outbound roamer of a Home Public Mobile Network (HPMN) in a Visited Public Mobile Network (VPMN), the outbound roamer having a mobile device, the HPMN having an associated gateway, a service node and a Signaling Control Point (SCP), the method comprising:

upon detecting a successful location update of the outbound roamer at the VPMN, enabling a client coupled to the mobile device based on observation of exchange of one or more parameters with the gateway, wherein the client is enabled by exchanging encapsulated IN messages with the gateway over one or more bearers, and wherein at least one of the HPMN and the VPMN is unable to support one selected from a group consisting of exchange of IN messages, and an IN agreement;

facilitating, via the gateway, communication between the client and one of the service node and the SCP, wherein the gateway translates the exchanged encapsulated IN messages in a protocol that is compatible with one selected from a group consisting of the service node and the SCP; and managing the outbound roamer's IN services via the gateway and one of the service node and the SCP by updating, at the client, one or more traffic control conditions of the outbound roamer based on recognition of the exchanged encapsulated IN messages.

2. The method of claim 1, wherein the client is one selected from a group consisting of a SIM Tool Kit (STK) application, and a mobile application installed on the outbound roamer's mobile device.

3. The method of claim 1, wherein the client is a SIM Tool Kit (STK) application, the method further comprising:

checking, at the client, the capability of the outbound roamer's mobile device for transferring at least one selected from a group consisting of call control and message control, to the client, upon the successful location update at the VPMN.

4. The method of claim 1, wherein the gateway has a coupled Roaming Monitoring Device (RMD), the RMD being located in the HPMN, the method further comprising:

monitoring, via the RMD, the exchange of one or more parameters and the successful location update.

5. The method of claim 1, wherein the one or more parameters include at least one selected from a group consisting of a device identifier, a cell identifier (ID), a Visitor Location Register/Visited Mobile Switching Centre (VLR/VMSC) address, a location ID, a service subscription information, an International Mobile Subscriber Identity (IMSI), a Personal Identification Number (PIN) and a Mobile Station International Subscriber Directory Number (MSISDN).

6. The method of claim 5, the HPMN having an associated HLR, wherein: the service subscription information is prefetched, via the gateway, from the HLR before enablement of the client; and wherein the service subscription information is stored in at least one selected from a group consisting of the client and the gateway.

7. The method of claim 5, the mobile device having a mobile device identifier, wherein, upon enablement of the client, the client is locked with the mobile device identifier, and the gateway and the client exchange messages using the IMSI and a security key.

8. The method of claim 1, wherein the one or more bearers include at least one selected from a group consisting of an Unstructured Supplementary Service Data (USSD), a Short Message Service (SMS), Supplementary Services (SS), General Packet Radio System (GPRS) data, Session Initiation Protocol (SIP) data, and future bearer services; and wherein the client and the gateway use identical or different bearers to exchange encapsulated IN messages.

9. The method of claim 8, the client and the gateway each having preferred and alternative bearers, wherein one of the gateway and the client selects an alternative bearer when a preferred bearer is not supported by one of the HPMN and the VPMN.

10. The method of claim 8, wherein the HPMN filters Transferred Account Protocol (TAP) records to avoid charging the outbound roamer for the use of one or more bearers while exchanging the encapsulated IN messages.

11. The method of claim 1, wherein the outbound roamer's traffic control conditions are updated via one selected from a group consisting of dynamic enforcement of call barring, dynamic removal of call barring, dynamic routing of calls and messages, and dynamic termination of calls.

12. The method of claim 11, the encapsulated IN messages having a service, wherein the call barring is removed based on identification of the service in the encapsulated IN messages.

13. The method of claim 12, wherein, upon removal of the call barring, the client sends to the gateway at least one selected from a group consisting of progress reports and event reports.

14. The method of claim 13, wherein the gateway issues a subscriber information message to check the status of a call upon non-receipt of at least one selected from a group consisting of the progress report and the event report from the client, within a configurable time period.

15. The method of claim 14, wherein the gateway facilitates termination of the call upon non-receipt of the progress report from the client within the configurable time period.

16. The method of claim 13, wherein the call barring is enforced upon non-receipt of at least one selected from a group consisting of the event report and the progress report at the gateway during a pre-defined time-out period.

17. The method of claim 11, wherein the call barring is enforced when at least one selected from a group consisting of answer, disconnect, busy and no-answer event report is received at the gateway from the client.

18. The method of claim 11, wherein the dynamic routing of calls is performed using one selected from a group consisting of a call back technique via the HPMN, and direct application logic.

19. The method of claim 11, the HPMN having an associated switch for routing a call, wherein one or more call events, call release and call termination messages are exchanged between the gateway and the switch over an interface when the call is routed through the switch via the interface.

20. The method of claim 11, wherein the dynamic termination of calls is performed by one selected from a group consisting of: sending a cancel location message; sending an Immediate Service Termination (IST) message; establishing a call on a fake emergency call number stored by the client; and causing the outbound roamer's handset to send a polling request to the client and terminate the call upon one selected from a group consisting of non-receipt and error response to the polling request from the client.

21. The method of claim 18, the VPMN having a Visitor Location Register (VLR), the method further comprising: at the gateway, maintaining a database of one or more VLRs that support the cancel location message, so as to enable routing of calls via the HPMN.

22. The method of claim 12, wherein dynamic routing of messages includes: routing the messages from the client to one of the service node and the SCP via the gateway so as to control billing of the messages at one of the service node and the SCP.

23. The method of claim 1, the outbound roamer being included in a class of subscribers, wherein the gateway dynamically disables a late call forwarding status for the outbound roamer after the successful location update, for the class of subscribers.

24. The method of claim 10, wherein the gateway generates a Call Detail Record (CDR), the method further comprising: reconciling the TAP records with the CDR using a routing number.

25. The method of claim 1, wherein the outbound roamer is a postpaid subscriber, the method further comprising: at the gateway, restricting outgoing international calls of the outbound roamer.

26. A method for enabling support of Intelligent Network (IN) services for an outbound roamer of a Home Public Mobile Network (HPMN) in a Visited Public Mobile Network (VPMN), the outbound roamer having a mobile device, the HPMN having an associated gateway, a service node and a Signaling Control Point (SCP), the method comprising:
    at the gateway, upon detecting a successful location update of the outbound roamer, receiving encapsulated IN messages over one or more bearers wherein the HPMN is unable to support at least one selected from a group consisting of exchange of IN messages and an IN agreement;
    facilitating, via the gateway, communication with the service node and the SCP, wherein the gateway translates the received encapsulated IN messages into a protocol that is compatible with at least one selected from a group consisting of the service node and the SCP; and
    managing the outbound roamer's IN services via the gateway and one of the service node and the SCP, by updating one or more traffic control conditions of the outbound roamer based on recognition of the received encapsulated IN messages.

27. A method for enabling support of Intelligent Network (IN) services for an outbound roamer of a Home Public Mobile Network (HPMN) in a Visited Public Mobile Network (VPMN), the outbound roamer having a mobile device and being coupled to a client, the HPMN having an associated gateway, a service node and a Signaling Control Point (SCP), the method comprising:
    sending, via the client, encapsulated IN messages over one or more bearers, after a successful location update of the outbound roamer, wherein the HPMN is unable to support exchange of IN messages and an IN agreement;
    facilitating communication between the client and one of the service node and the SCP, wherein the exchanged encapsulated IN messages are translated in a protocol compatible with one selected from a group consisting of the service node and the SCP; and
    managing the outbound roamer's IN services via one of the service node and the SCP by updating, at the client, one or more traffic control conditions of the outbound roamer based on recognition of the exchanged encapsulated IN messages.

28. A system for enabling support of Intelligent Network (IN) services for an outbound roamer of a Home Public Mobile Network (HPMN) in a Visited Public Mobile Network (VPMN), the outbound roamer having a mobile device, the HPMN having an associated gateway, a service node and a Signaling Control Point (SCP), the system comprising:
    a client coupled to the outbound roamer's mobile device; and
    a gateway in the HPMN for enabling the client based on observation of exchange of one or more parameters with the client, upon detecting a successful location update of the outbound roamer in a VPMN; wherein the gateway enables the client by exchanging encapsulated IN messages with the client over one or more bearers when at least one of the HPMN and the VPMN is unable to support at least one selected from a group consisting of exchange of IN messages and an IN agreement;
    wherein the gateway facilitates communication between the client and one selected from a group consisting of the service node and the SCP, by translating the encapsulated IN messages in a protocol compatible with the selected one of the service node and the SCP; and
    wherein the gateway and the selected one of the service node and the SCP manage the outbound roamer's IN based services from the HPMN by updating, at the client, one or more traffic control conditions of the outbound roamer, based on recognition of the exchanged encapsulated IN messages.

29. The system of claim 28, wherein the gateway communicates with the client and the selected one of the service node and the SCP using at least one of a CAP and an IN protocol.

30. The system of claim 28, wherein the gateway includes a database comprising at least one selected from a group consisting of an IMSI, an IMEI, a PIN and a service subscription information, a service key, a cell ID, and a location ID associated with the outbound roamer.

* * * * *